(12) United States Patent
Satake Neto et al.

(10) Patent No.: US 12,018,439 B2
(45) Date of Patent: Jun. 25, 2024

(54) EMBOSSED MULTI-PLY TISSUE PRODUCT

(71) Applicant: Kimberly-Clark Worldwide, Inc., Neenah, WI (US)

(72) Inventors: Tsutama Satake Neto, Sao Paulo (BR); Jorge Alonso Duran, Sao Paulo (BR); Patricia Câmara Mileo, Sao Paulo (BR)

(*) Notice: Subject to any disclaimer, the term of this patent is extended or adjusted under 35 U.S.C. 154(b) by 0 days.

(21) Appl. No.: 17/668,067

(22) Filed: Feb. 9, 2022

(65) Prior Publication Data

US 2022/0275584 A1 Sep. 1, 2022

Related U.S. Application Data

(62) Division of application No. 17/259,674, filed as application No. PCT/US2019/052712 on Sep. 24, 2019, now Pat. No. 11,280,051.

(Continued)

(51) Int. Cl.
*D21H 27/40* (2006.01)
*A47K 10/16* (2006.01)
(Continued)

(52) U.S. Cl.
CPC ............. *D21H 27/40* (2013.01); *A47K 10/16* (2013.01); *B31F 1/07* (2013.01); *B32B 3/28* (2013.01);
(Continued)

(58) Field of Classification Search
CPC ...... D21H 27/40; D21H 27/002; D21H 27/02; B31F 1/07; B31F 2201/0735;
(Continued)

(56) References Cited

U.S. PATENT DOCUMENTS

D5,657 S   3/1872   Campbell
D6,105 S   9/1872   Ney
(Continued)

FOREIGN PATENT DOCUMENTS

EP    1428654 A1   6/2004
WO    2009060353 A1   5/2009
WO    WO-2017196517 A1 * 11/2017 ............. A47K 10/16

OTHER PUBLICATIONS

Judikins Square Kite Artisic Stencils & Templates, date unknown found on Jul. 19, 2019 at https://www.joann.com/judikins-kite-artisic-stencils-and-templates-retro-path/14560684.html.
(Continued)

*Primary Examiner* — Catherine A. Simone
(74) *Attorney, Agent, or Firm* — KIMBERLY-CLARK WORLDWIDE, INC.

(57) ABSTRACT

Disclosed are multi-ply embossed tissue products having improved softness, strength, embossment clarity and/or embossment height compared to prior art embossed tissue products. The multi-ply tissue products may comprise an embossed tissue ply having a basis weight less than about 25 grams per square meter (gsm) and relatively deep embossments, such as an embossment height from about 500 to about 1,000 μm and relatively narrow bottom portions compared to top portions. The combination of these elements provides an aesthetically pleasing and well-defined embossment, while improving important tissue product properties such as sheet and roll bulk and softness.

9 Claims, 18 Drawing Sheets

Related U.S. Application Data

(60) Provisional application No. 62/738,053, filed on Sep. 28, 2018.

(51) Int. Cl.
| | | |
|---|---|---|
| *B31F 1/07* | (2006.01) | |
| *B32B 3/28* | (2006.01) | |
| *B32B 29/00* | (2006.01) | |
| *D21H 27/00* | (2006.01) | |
| *D21H 27/02* | (2006.01) | |

(52) U.S. Cl.
CPC ......... *B32B 29/005* (2013.01); *D21H 27/002* (2013.01); *D21H 27/02* (2013.01); *B31F 2201/0735* (2013.01); *B31F 2201/0764* (2013.01); *B31F 2201/0782* (2013.01); *B31F 2201/0787* (2013.01)

(58) Field of Classification Search
CPC ...... B31F 2201/0764; B31F 2201/0782; B31F 2201/0787; B32B 29/005; B32B 3/28; A47K 10/16
USPC .......................................................... 428/154
See application file for complete search history.

(56) References Cited

U.S. PATENT DOCUMENTS

| | | |
|---|---|---|
| D7,818 S | 11/1874 | Campbell |
| D12,419 S | 8/1881 | Schmid |
| D15,969 S | 3/1885 | Folsom |
| D23,566 S | 8/1894 | Booze |
| D24,829 S | 11/1895 | Booz |
| D24,840 S | 11/1895 | Booz |
| D26,139 S | 9/1896 | Booz |
| D41,195 S | 2/1911 | Sauer |
| D43,648 S | 2/1913 | Sauer |
| D44,871 S | 11/1913 | Gair |
| D82,362 S | 10/1930 | Allen et al. |
| D84,415 S | 6/1931 | Gross |
| D103,274 S | 2/1937 | Turpan |
| D104,987 S | 6/1937 | Brooks |
| D127,101 S | 5/1941 | Rosenstein |
| D131,261 S | 1/1942 | Jolles |
| 4,546,025 A | 10/1985 | Vaisman |
| 5,871,615 A | 2/1999 | Harris |
| D421,528 S | 3/2000 | Shakora |
| D426,960 S | 6/2000 | Jahner et al. |
| D428,265 S | 7/2000 | Jahner et al. |
| D428,708 S | 8/2000 | Jahner et al. |
| D429,893 S | 8/2000 | Jahner et al. |
| D441,540 S | 5/2001 | Enderby et al. |
| D443,146 S | 6/2001 | Enderby et al. |
| 6,733,866 B2 * | 5/2004 | Muller .................... B32B 29/08 428/154 |
| 7,540,939 B2 | 6/2009 | Graff et al. |
| 8,936,845 B2 * | 1/2015 | Tsai ....................... D21H 27/30 428/154 |
| D831,979 S | 10/2018 | Sierra et al. |
| 10,280,567 B2 | 5/2019 | Vogt et al. |
| D864,588 S | 10/2019 | Satake Neto et al. |
| 2004/0023003 A1 | 2/2004 | Basler et al. |
| 2007/0272381 A1 | 11/2007 | Elony et al. |
| 2009/0226670 A1 | 9/2009 | Schütz |
| 2009/0297781 A1 | 12/2009 | Huss et al. |
| 2010/0136291 A1 | 6/2010 | Graff |
| 2010/0233440 A1 * | 9/2010 | Tsai ....................... B32B 29/06 428/179 |
| 2012/0088076 A1 | 4/2012 | Glakpe et al. |
| 2018/0135254 A1 | 5/2018 | Bhat |
| 2018/0216298 A1 * | 8/2018 | Vogt ....................... D21H 27/40 |

OTHER PUBLICATIONS

Embossing Cylinders, Kesper Druckwalzen GmbH, dated unknown found on Jul. 19, 2019 at https://www.kesper-druckwalzen.de/en/products/embossing-cylinders/.

Xcut Embosing Folder A6, date unknown found on Jul. 19, 2019 at http://www.thewholesaler.biz/blog/gorjuss-girl/.

* cited by examiner

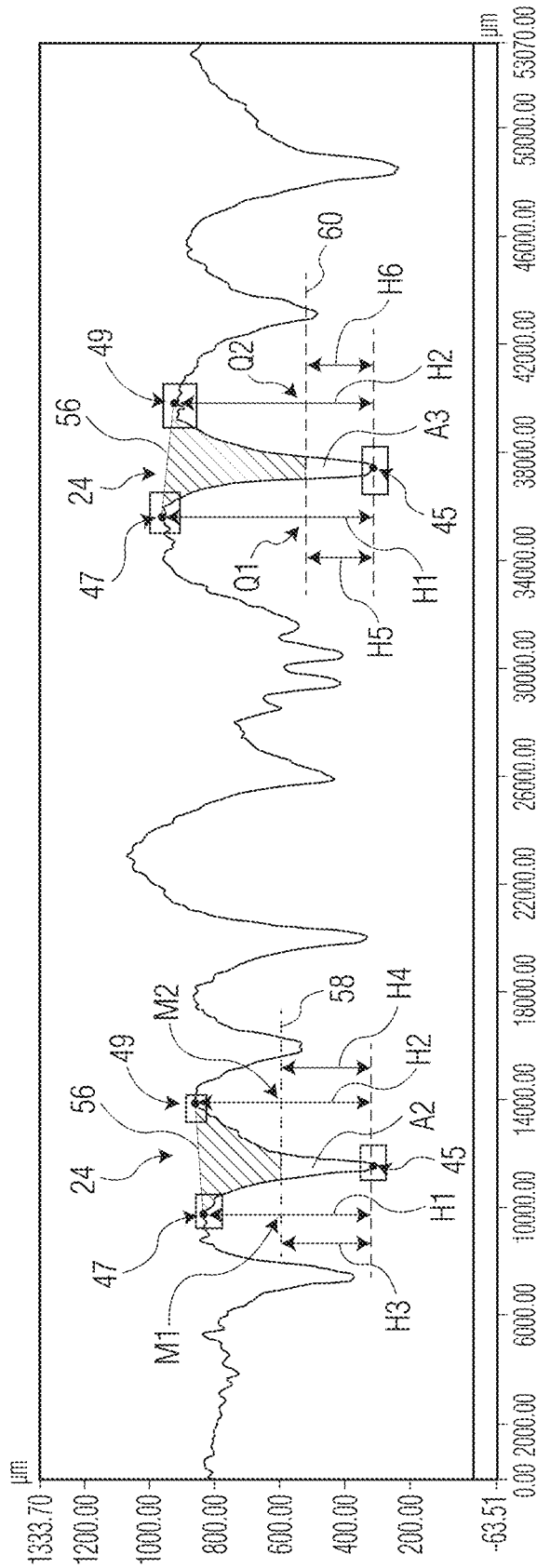

EMBOSSED MULTI-PLY TISSUE PRODUCT

RELATED APPLICATIONS

The present application is a divisional application and claims priority to U.S. patent application Ser. No. 17/259,674, filed on Jan. 12, 2021, which is a national-phase entry, under 35 U.S.C. § 371, of PCT Patent Application No. PCT/US19/52712, filed on Sep. 24, 2019, which claims benefit of U.S. Provisional Application No. 62/738,053, filed on Sep. 28, 2018, all of which are incorporated herein by reference.

BACKGROUND

It is well known to emboss bond multiple plies of lightweight cellulosic material to form tissue products such as bath tissues, facial tissues, paper towels, industrial wipers, foodservice wipers, napkins, medical pads, and other similar products. The embossed tissue products may comprise one, two, three or more plies. Embossing not only plies multiple webs together but may also impart the tissue product with an aesthetically pleasing pattern. Examples of apparatus and methods for embossing multi-ply paper products are disclosed, for example, in U.S. Pat. Nos. 6,733,866, 7,871,692 and 8,287,986 and U.S. Publication No. 2012/0156447.

Embossing may also be used to alter or improve certain tissue product properties such as sheet bulk and perceived softness. For example, tissue products manufactured using conventional creped wet press technology can be embossed subsequent to creping to improve bulk and perceived softness. Embossing often increases the surface area of the sheets my introducing a plurality of protuberances and thereby enhances the bulk and handfeel of the product. Examples of apparatus and methods for embossing multi-ply paper products to improve handfeel and bulk are disclosed, for example, in U.S. Publication Nos. 2005/0103456, 2018/0142422 and 2018/0135254.

Often tissue products marketed in rolls, contain a specified number of sheets per roll. Tissue embossed in conventional patterns of dot embossments, when packaged in roll form, exhibit a tendency to be non-uniform in appearance often due compressing of the embossments as the sheet is wound onto the roll, detracting from the appearance of the rolls.

SUMMARY

The present inventors have now discovered novel embossed multi-ply tissue products having improved softness, strength, embossment clarity and/or embossment height compared to prior art embossed tissue products. For example, the multi-ply tissue products of the present invention may comprise a plurality of embossments that are relatively deep and have relatively narrow bottom portions compared to top portions. In a particularly preferred embodiment, the product may comprise an embossed ply having a plurality of dot embossments disposed thereon, the dot embossments having a height—defined as $H_{100}$ and measured as described herein—greater than about 500 µm, such as from about 500 to about 1,000 µm and relatively narrow bottom portions compared to top portions such as a ratio of the average width at 100% height ($W_{100}$) to the average width at 25% height ($W_{25}$) greater than about 3.0, such as from about 3.0 to about 4.0. The combination of these elements provides an aesthetically pleasing and well-defined embossment, while improving important tissue product properties such as sheet and roll bulk and softness.

In other embodiments the present invention provides a multi-ply tissue product comprising a top ply having a first surface having a plurality of discrete, spaced apart, dot embossments disposed thereon and a plurality of dome-like structures disposed between the spaced apart dot embossments and a bottom ply having a first surface having a plurality of discrete embossments disposed thereon, wherein the dot embossments have a height ($H_{100}$) greater than 500 µm and an average width at 25% height ($W_{25}$) less than about 600 µm.

In still other embodiments the present invention provides a multi-ply tissue product, such as a product comprising three, four, five or six plies, wherein the basis weight of each of the plies is less than about 25 grams per square meter (gsm), such as from about 10 to about 25 gsm and more preferably from about 15 to about 20 gsm, and at least the upper most ply comprises a plurality of spaced apart dot embossments having a height ($H_{100}$) greater than 500 µm and an average width at 25% height ($W_{25}$) less than about 600 µm.

In other embodiments the present invention provides a multi-ply tissue product comprising a first ply having an unembossed region having an upper surface lying in a first tissue product surface plane, a plurality of spaced apart first dot embossments and a dome-like structure disposed between at least two spaced apart first dot embossments, the dome-like structure having an upper surface lying in a second tissue product surface plane, wherein the second tissue product surface plane is at least 100 µm above the first tissue product surface plane. In certain instances, the dome-like structure may be supported by an embossment disposed on a second ply having an embossment that nests into the dome-like structure and is bounded by the first and second discrete embossments disposed on the first ply. In other instances, the tissue product may contain a third ply disposed between the first and second plies, wherein the third ply comprises embossments registered with the first and second discrete embossments of the first ply and the third ply is bonded to the first ply.

In yet other embodiments the invention relates to a method of producing a tissue product comprising the steps of: (a) providing a first embossing station with a first embossing roll having a first pattern disposed thereon and a first counter roll, the first embossing roll and first counter roll defining a first nip there between; (b) providing a second embossing station with a second embossing roll having a second pattern disposed thereon and a second counter roll, the second embossing roll and second counter roll defining a second nip there between; (c) providing a marrying roll in opposition to the first counter roll to define a third nip there between; (d) synchronizing the rotation of the first and second embossing rolls; (d) directing a first and a second tissue ply into the first nip; (d) applying an adhesive to the surface of the second ply; (e) directing a third tissue ply into the second nip; (e) directing the three plies through the third nip thereby adhesively attaching the third ply to the second ply.

The device for manufacturing a tissue product includes a first embossing station with a first embossing roll and a first anvil roll, a second embossing station with a second embossing roll and a second anvil roll, the second anvil roll being a rubber roll or a steel roll, an adhesive applicator roll running against the first embossing roll and a marrying roll running against the first embossing roll. The first embossing roll and the second embossing roll are adapted to run in registration with one another. This is a relatively simple device which can be used to emboss the top and bottom plies and to combine the plies in a nested configuration in the nip between the first embossing roll and a marrying roll. In order to realize the desired nested configuration with the embossments applied to the top ply bounding the embossments applied to the bottom such that a dome-like structure is formed between the embossments of the first ply and supported by the embossments of the second ply, the first embossing station and second embossing station are registered with one another such that the positional relationship of the first embossing protuberances and the second embossing protuberances can be predetermined in the final product.

In still other embodiments the present invention provides a tissue product, such as a bath tissue product and more particularly a multi-ply bath tissue product, having a basis weight from about 40 to about 60 grams per square meter (gsm), wherein each of the plies have a basis weight less than about 25 gsm and more preferably less than about 20 gsm, such as from about 10 to about 25 gsm and more preferably from about 15 to about 20 gsm, the product having a geometric mean tensile strength less than about 800 g/3", such as from about 800 to about 1,700 g/3". The tissue product includes at least one top ply, at least one middle ply and at least one bottom ply. The term "at least one" should indicate that the top ply, middle ply and bottom ply can in themselves be a multi-ply structure, respectively. However, if, e.g., a double ply bottom ply is used, such plies are not processed separately when embossing and bonding together the tissue product. In the following description, when reference is made to the top ply, the middle ply or the bottom ply, this includes the above-described option that these plies are made up of more than one tissue ply.

In yet other embodiments the top ply of a multi-ply tissue product of the present invention is provided with an embossing pattern comprising a plurality of discrete first embossments and dome-like structures disposed between the first embossments and the bottom ply is embossed with second embossments that nest into the dome-like structures disposed between first embossments of the top ply. In particular instances the second embossments are shaped so as to be substantially complementary to the dome-like structure disposed on the top ply.

In other embodiments the present invention provides a tissue product comprising a first surface having a plurality of first embossments disposed thereon and a second surface having a plurality of second embossments disposed thereon, wherein the first and second embossments are discrete and differ in at least height and area. In certain preferred embodiments the first embossments may be dot embossments having a relatively small surface area and good height and the second embossments may be larger, more elaborately shaped embossments having less height. Further, the first side may comprise dome-like structures bounded by the first embossments, wherein the dome-like structures provide a soft handfeel and a cushiony appearance.

In still other embodiments the invention provides a tissue product comprising a first surface having a plurality of dot embossments disposed in a pattern and bounding a dome-like structure, the dome-like structure comprises at least about 2 percent of the projected surface area of the product, such as from about 2 to about 10 percent, such as from about 5 to about 8 percent. This embossing pattern forms cushions that are surrounded by regions of compressed material. Generally, the dot embossments of the present invention have a shape of interrupted lines or a shape of small individual points or spots that may be arranged relative to one another to provide the appearance of a line or a design. The dot embossments need not have a circular cross-sectional shape at the tissue surface and in certain instances may have a curvilinear or rectilinear cross-sectional shape. For example, the dot embossments may have a rectilinear cross-sectional shape that may be arranged to form the appearance of dashed lines. In other instances, the dot embossment cross-sectional shape may be a circle, an oval, an ellipse, a square, or a triangle.

BRIEF DESCRIPTION OF DRAWINGS

FIG. 5C is a cross-sectional height profile of the product of FIG. 5B through line A-A;

DEFINITIONS

Figure 1:
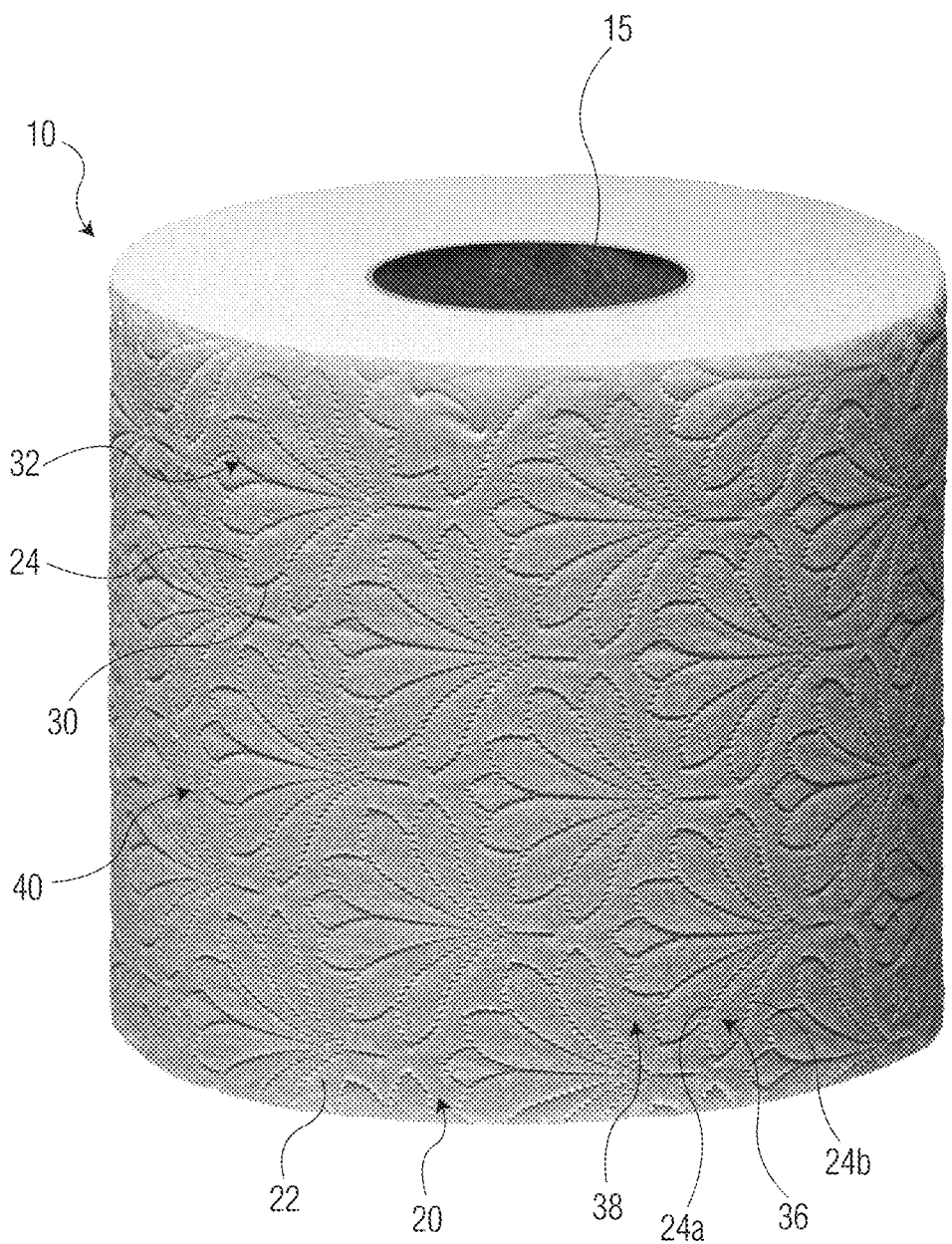
FIG. 1 is perspective view of a rolled tissue product according to one embodiment of the present invention.

As used herein the term "tissue web" refers to a structure comprising a plurality of fibers such as, for example, papermaking fibers and more particularly pulp fibers, including both wood and non-wood pulp fibers, and synthetic staple fibers. A non-limiting example of a tissue web is a wet-laid sheet material comprising pulp fibers.

As used herein the term "tissue product" refers to products made from tissue webs and includes, bath tissues, facial tissues, paper towels, industrial wipers, foodservice wipers, napkins, medical pads, and other similar products. Tissue products may comprise one, two, three or more plies.

As used herein the term "layer" refers to a plurality of strata of fibers, chemical treatments, or the like, within a ply.

The term "ply" refers to a discrete product element. Individual plies may be arranged in juxtaposition to each other. The term may refer to a plurality of web-like components such as in a multi-ply facial tissue, bath tissue, paper towel, wipe, or napkin.

As used herein, the term "basis weight" generally refers to the bone dry weight per unit area of a tissue and is generally expressed as grams per square meter (gsm). Basis weight is measured using TAPPI test method T-220.

As used herein, the term "caliper" is the representative thickness of a single sheet (caliper of tissue products comprising two or more plies is the thickness of a single sheet of tissue product comprising all plies) measured in accordance with TAPPI test method T402 using an EMVECO 200-A Microgage automated micrometer (EMVECO, Inc., Newberg, OR). The micrometer has an anvil diameter of 2.22 inches (56.4 mm) and an anvil pressure of 132 grams per square inch (per 6.45 square centimeters) (2.0 kPa).

As used herein, the term "sheet bulk" refers to the quotient of the caliper (μm) divided by the bone dry basis weight (gsm). The resulting sheet bulk is expressed in cubic centimeters per gram (cc/g). Tissue products prepared according to the present invention generally have a sheet bulk greater than about 7.0 cc/g, more preferably greater than about 8.0 cc/g and still more preferably greater than about 9.0 cc/g, such as from about 7.00 to about 11.0 cc/g, such as from about 8.00 to about 10.0 cc/g.

As used herein, the term "slope" refers to the slope of the line resulting from plotting tensile versus stretch and is an output of the MTS TestWorks™ in the course of determining the tensile strength as described in the Test Methods section herein. Slope is reported in the units of grams (g) per unit of sample width (inches) and is measured as the gradient of the least-squares line fitted to the load-corrected strain points falling between a specimen-generated force of 70 to 157 grams (0.687 to 1.540 N) divided by the specimen width. Slopes are generally reported herein as having units of kilograms per sample width, such as kg/3".

As used herein, the term "geometric mean slope" (GM Slope) generally refers to the square root of the product of machine direction slope and cross-machine direction slope. GM Slope generally is expressed in units of kg.

As used herein, the terms "geometric mean tensile" (GMT) refers to the square root of the product of the machine direction tensile strength and the cross-machine direction tensile strength of the web.

As used therein the term "dot embossment" means an embossment that exhibits an aspect ratio of about 1:1. Non-limiting examples of dot embossments are embossments having a circular, oval, square, or triangular cross-sectional shape.

Figure 4A:
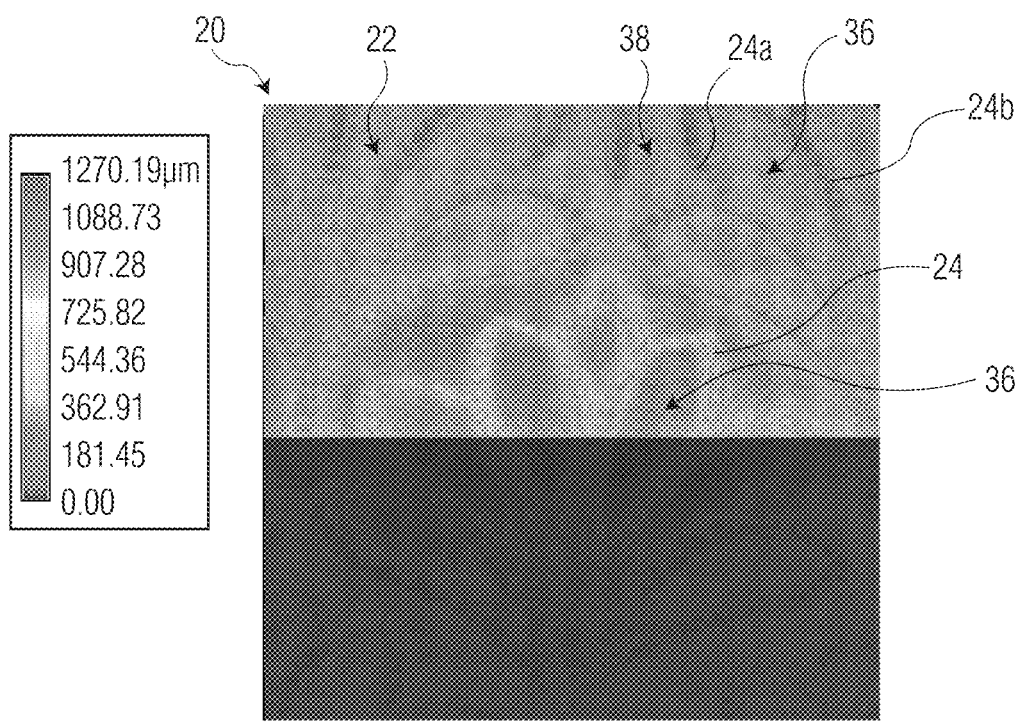
FIG. 4A is a 3-D surface profile of a tissue product according to one embodiment of the present invention, the image was taken using a VHX-1000 Digital Microscope manufactured by Keyence Corporation (Osaka, Japan) at a magnification of ×100.
Figure 4B:
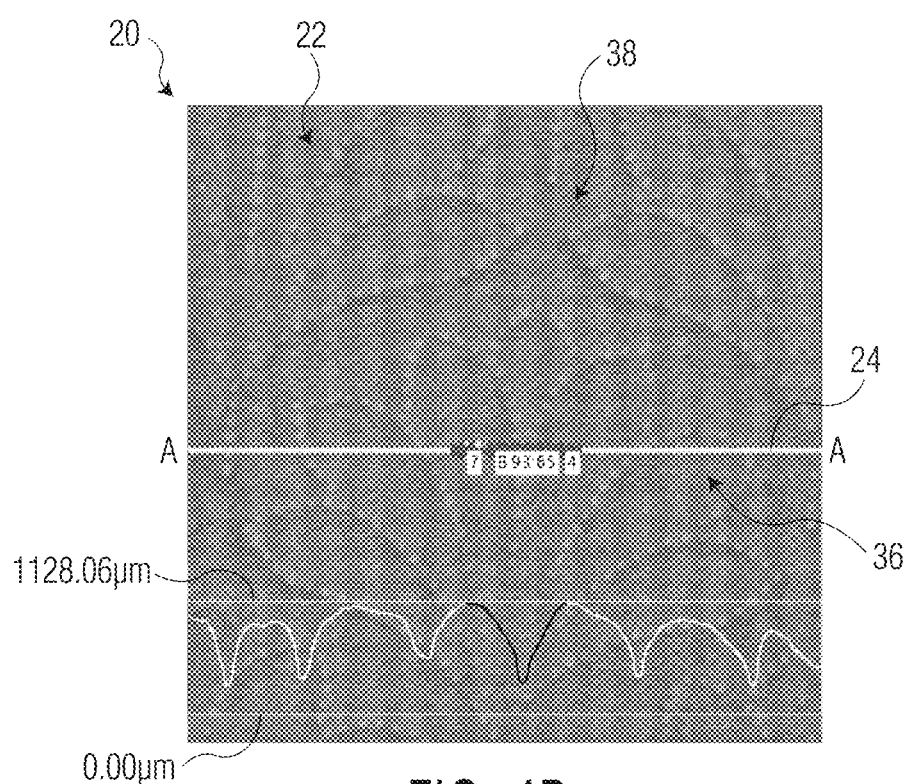
FIG. 4B is a 2-D image of the product of FIG. 4A and a plot of the surface topography through line A-A, the image was taken using a VHX-1000 Digital Microscope manufactured by Keyence Corporation (Osaka, Japan) at a magnification of ×100.
Figure 4C:
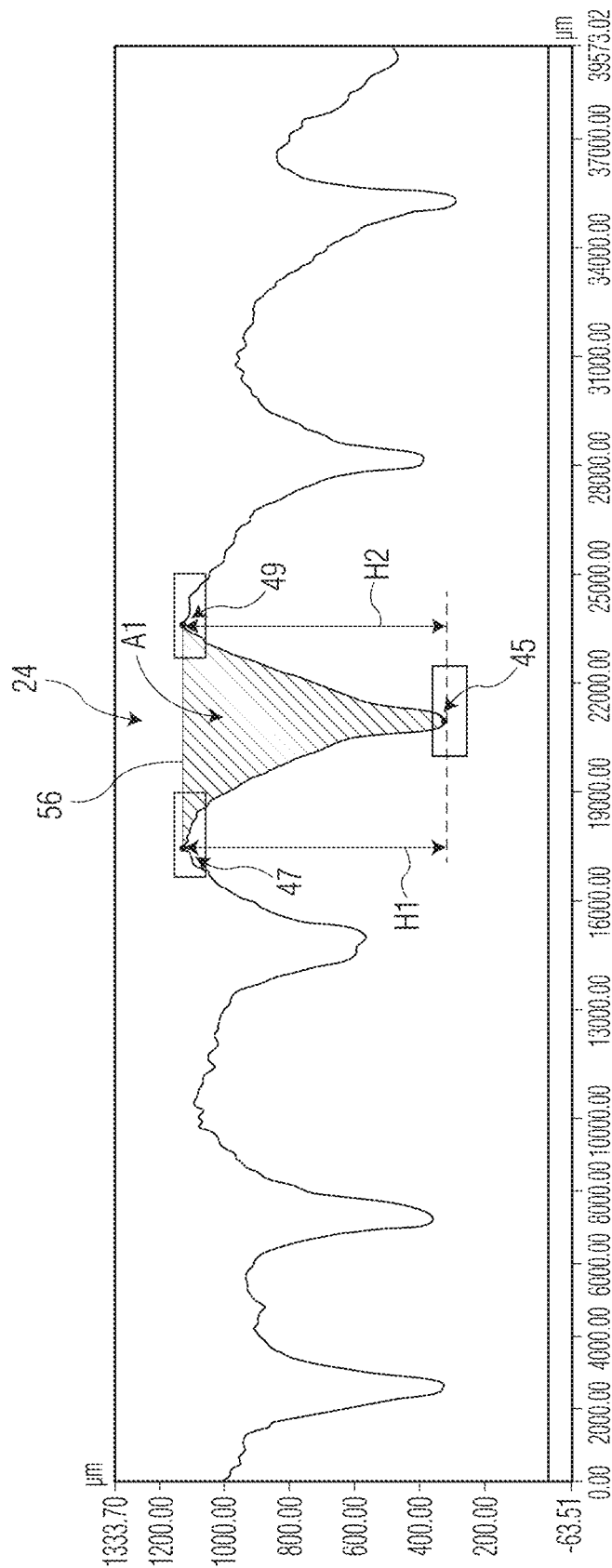
FIG. 4C is a cross-sectional height profile of the product of FIG. 4B through line A-A.

As used herein the term "Average Height at 100%" ($H_{100}$) for a given embossment 24 (as illustrated in FIG. 4C) refers to the average of the z-directional distance between the embossment minimum 45 and the left-most embossment maximum 47 (H1) and the z-directional distance between the embossment minimum 45 and the right-most embossment maximum 49 (H2). $H_{100}$ typically has units of microns (μm) and is measured as described in the Test Methods section below.

As used herein the term "Average Height at 50%" ($H_{50}$) for a given embossment 24 (as illustrated in FIG. 5C) refers to the average of the z-directional distance (H3) between the midpoint M1 of a straight line H1 intersecting the embossment minimum 45 and the left-most embossment maximum 47 and the z-directional distance (H4) between the midpoint M2 of the a straight line H2 intersecting the embossment minimum 45 and the right-most embossment maximum 49. $H_{50}$ typically has units of microns (μm) and is measured as described in the Test Methods section below.

As used herein the term "Average Height at 25%" ($H_{25}$) for a given embossment 24 (as illustrated in FIG. 5C) refers to the average of the z-directional distance (H5) between a point Q1 at 25% of the straight line H1 intersecting the embossment minimum 45 and the left-most embossment maximum 47 and the z-directional distance (H6) between a point Q2 at 25% of the straight line H2 intersecting the embossment minimum 45 and the right-most embossment maximum 49. $H_{25}$ typically has units of microns (μm) and is measured as described in the Test Methods section below.

As used herein the term "Area at 100%" ($A_{100}$) for a given embossment 24 (as illustrated in FIG. 4C) refers to the area A1 of the embossment 24 below a straight line 56 intersecting the right and left-most embossment maximums 47, 49. $A_{100}$ typically has units of square microns (μm²) and is measured as described in the Test Methods section below.

As used herein the term "Area at 50%" ($A_{50}$) for a given embossment 24 (as illustrated in FIG. 5C) refers to the area A2 of the embossment 24 below a straight line 58 intersecting midpoints M1, M2. $A_{50}$ typically has units of square microns (μm²) and is measured as described in the Test Methods section below.

As used herein the term "Area at 25%" ($A_{25}$) for a given embossment 24 (as illustrated in FIG. 5C) refers to the area A3 of the embossment 24 below a straight line 60 intersecting a points Q1 and Q2. $A_{25}$ typically has units of square microns (μm²) and is measured as described in the Test Methods section below.

As used here the term "Average Width at 100% Height" ($W_{100}$) for a given embossment 24 (as illustrated in FIG. 5C) generally refers to the length of a straight line 56 intersecting the right and left-most embossment maximums 47, 49. $W_{100}$ may be calculated by dividing the Area at 100% ($A_{100}$) by the Average Height at 100% ($H_{100}$):

$$W_{100} = \frac{A_{100}}{H_{100}}$$

$W_{100}$ typically has units of microns (μm) and is measured as described in the Test Methods section below.

As used here the term "Average Width at 50% Height" ($W_{50}$) generally refers to the average width of the embossment near its midpoint. For a given embossment 24 (as illustrated in FIG. 5C) $W_{50}$ is generally the length of a straight line 58 intersecting midpoints M1, M2. $W_{50}$ may be calculated by dividing the Area at 50% ($A_{50}$) by the Average Height at 50% ($H_{50}$):

$$W_{50} = \frac{A_{50}}{H_{50}}$$

$W_{50}$ typically has units of microns (μm) and is measured as described in the Test Methods section below.

As used here the term "Average Width at 25% Height" ($W_{25}$) generally refers to the average width of the embossment at 25% of its height. For example, as illustrated in FIG. 5C, $W_{25}$ is the length of the straight line 60 intersecting points Q1 and Q2, which are 25% of the height of the right and left-most embossment maximums. $W_{25}$ may be calculated by dividing the Area at 25% ($A_{25}$) by the Average Height at 25% ($H_{25}$):

$$W_{25} = \frac{A_{25}}{H_{25}}$$

$W_{50}$ typically has units of microns μm and is measured as described in the Test Methods section below.

DETAILED DESCRIPTION

The present invention provides a multi-ply embossed tissue product having improved softness, strength, embossment clarity and/or embossment height compared to prior art embossed tissue products. Accordingly, in one embodiment the present invention provides a multi-ply tissue product comprising an embossed tissue ply having a basis weight less than about 25 grams per square meter (gsm), such as from about 10 to about 25 gsm and more preferably from about 15 to about 20 gsm, and a plurality of embossments disposed thereon.

Preferably the embossments are shaped and sized to provide the tissue product with improved pattern clarity and definition. As such, the embossments may be relatively deep having a $H_{100}$, measured as described herein, greater than about 500 μm, such as from about 500 to about 1,000 μm. Further, the embossments may have relatively wide top portions compared to the bottom portions, which are relatively narrow. The relative dimension of the embossment top and bottom portions may be defined as the ratio of $W_{100}$ to $W_{25}$ and measured as described herein. For example, the product may comprise a plurality of embossments having a ratio of $W_{100}$ to $W_{25}$ greater than about 3.0, such as from about 3.0 to about 4.0. The combination of these elements provides an aesthetically pleasing and well-defined embossment, while improving important tissue product properties such as sheet and roll bulk and softness.

The tissue products of the present invention generally comprise two, three or four tissue plies made by well-known wet-laid papermaking processes such as, for example, creped wet pressed, modified wet pressed, creped through-air dried (CTAD) or uncreped through-air dried (UCTAD). For example, creped tissue webs may be formed using either a wet pressed or a modified wet pressed process such as those disclosed in U.S. Pat. Nos. 3,953,638, 5,324,575 and 6,080,279, the disclosures of which are incorporated herein in a manner consistent with the instant application. In these processes the embryonic tissue web is transferred to a Yankee dryer, which completes the drying process, and then creped from the Yankee surface using a doctor blade or other suitable device.

In other instances, the tissue plies may be manufactured by a through-air dried process known in the art. In such processes the embryonic web is noncompressively dried. For example, textured tissue plies may be formed by either creped or uncreped through-air dried processes. Particularly preferred are uncreped through-air dried webs, such as those described in U.S. Pat. No. 5,779,860, the contents of which are incorporated herein in a manner consistent with the present disclosure.

In still other instances the tissue plies may be manufactured by a process including the step of using pressure, vacuum, or air flow through the wet web (or a combination of these) to conform the wet web into a shaped fabric and subsequently drying the shaped sheet using a Yankee dryer, or series of steam heated dryers, or some other means, including but not limited to tissue made using the ATMOS process developed by Voith or the NTT process developed by Metso; or fabric creped tissue, made using a process including the step of transferring the wet web from a carrying surface (belt, fabric, felt, or roll) moving at one speed to a fabric moving at a slower speed (at least 5 percent slower) and subsequently drying the sheet. Those skilled in the art will recognize that these processes are not mutually exclusive, e.g., an uncreped TAD process may include a fabric crepe step in the process.

The instant multi-ply tissue product may be constructed from two or more plies that are manufactured using the same or different tissue making techniques. In a particularly preferred embodiment, the multi-ply tissue product comprises three plies where each of the plies comprises a wet-pressed tissue ply, where each ply has a basis weight greater than about 10.0 gsm, such as from about 10.0 to about 20.0 gsm, such as from about 12.0 to about 16.0 gsm.

Regardless of the tissue making process used to produce the individual plies, the resulting multi-ply tissue product has a first surface having a plurality of first embossments. As shown in FIG. 1, the tissue product may be in the form of a rolled tissue product 10 comprising an embossed multi-ply tissue sheet 20 spirally wound around a core 15. The tissue sheet 20 has a first surface 22 having a plurality of first embossments 24 disposed thereon. The plurality of first embossments 24 are similarly shaped and sized, having substantially similar surface area which, in certain instances, may range from about 0.070 to about 0.380 mm², such as from about 0.125 to about 0.280 mm².

The first embossments 24 may be a dot emboss element having a generally circular shape at the tissue surface 22. A dot emboss element, such as the first embossment 24, can be characterized by having a depth relative to the surface of the respective sheet surface 22 and a total embossment length to total embossment width (or an aspect ratio) of about 1. The first embossments 24 may be further arranged to provide the appearance of discontinuous lines 30, which are further arranged to form an embossed element 32 in the form of a flower. The embossed elements 32 are further arranged relative to one another to form a pattern 40 on the tissue surface 22.

Generally, the embossing pattern may comprise a plurality of embossing elements 32 having the same, similar or different shapes. Suitable embossing element shapes may include, for example, geometric shapes, organic shapes, abstract shapes, characters, and branding. In certain instances, the embossing elements may be geometric shapes, such as squares, octagons, pentagons, diamonds, triangles, circles, and the like. In other instances, the embossing element may be an organic shape that is illustrative of a natural object such as a leaf, a flower, a snowflake, or the like. In still other instances the embossing element may be an abstract shape, which may be derived from an actual object but not be immediately recognizable as such by a consumer.

With continued reference to FIG. 1, the first embossments 24 are arranged to provide the appearance of a discontinuous line 30 which delimits a dome-like structure 36 disposed between the spaced apart embossments, such as embossments 24a and 24b. The dome-like structures 36 may provide the tissue product 10 with a cushiony appearance. In certain instances, the dome-like structures may be entirely bounded by first embossments, which may be arranged to form a closed line element, and have an upper surface lying in a first surface plane above the upper surface of the first embossments. In other instances, the embossed elements 32 may be spaced apart from one another to define unembossed regions 38 there between. The unembossed regions 38 may have a surface lying in a second surface plane, which may be below the first surface plane defined by the upper surface of the dome-like structure.

Figure 2:
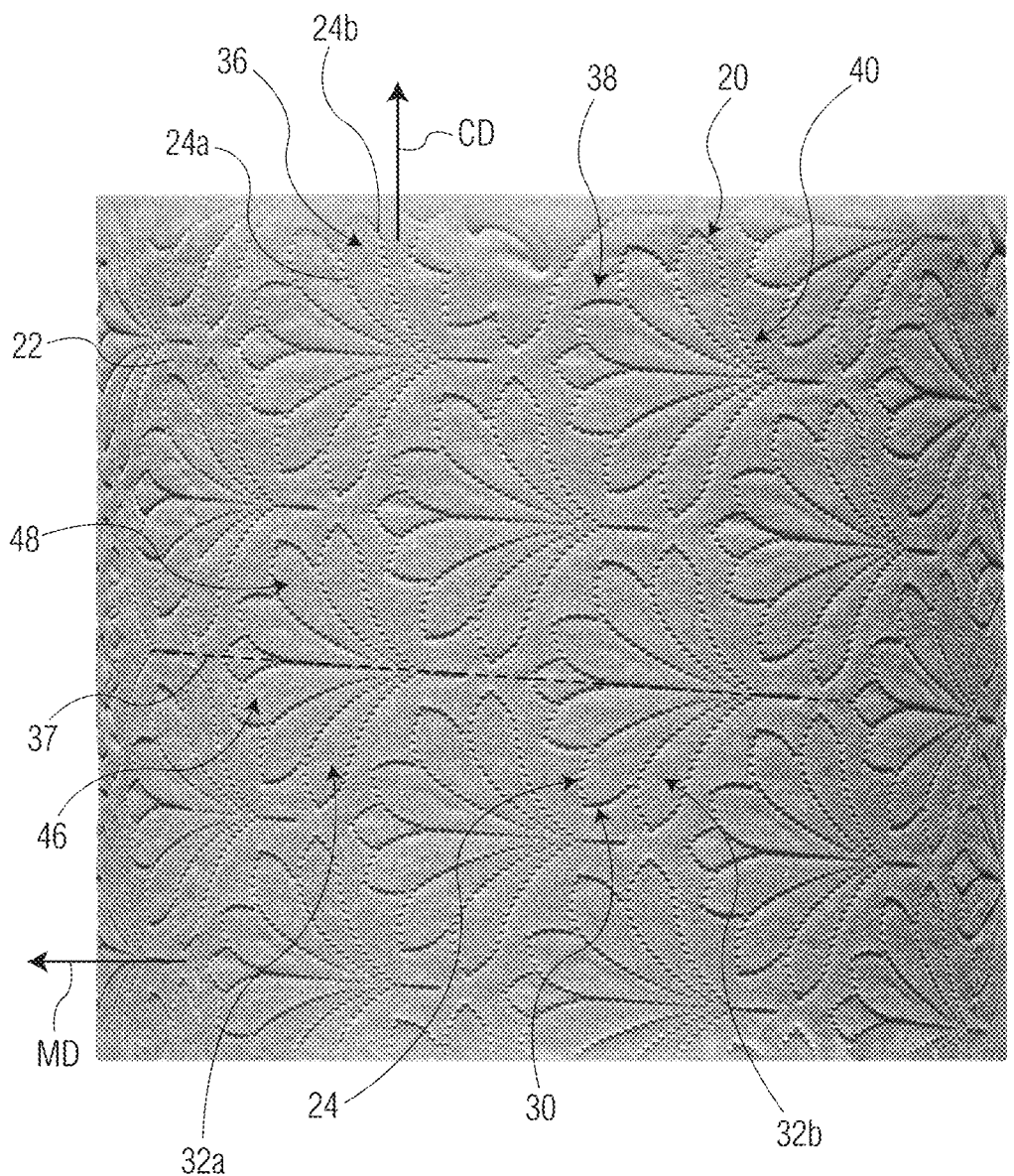
FIG. 2 is a top plan view of the tissue product of FIG. 1.

With reference now to FIG. 2, the embossing pattern 40 may comprise a plurality of similarly shaped and sized embossing elements 32 having an organic shape, such as a flower or a leaf. The non-limiting flower shaped embossing elements 32a, 32b have an axis of symmetry 37 that is generally aligned in the machine direction (MD) and divides the element into substantially equal first and second halves 46, 48.

The embossing elements may be arranged and sized to provide the product with an embossed pattern having a total embossed surface area ranging from about 5 to about 40 percent, more preferably ranging from about 8 to about 35 percent, even more preferably ranging from about 20 to about 25 percent. In a preferred embodiment, only embossed elements that are completely disposed upon the tissue sheet surface are utilized for the calculation of total embossed area.

Without desiring to be bound by theory, providing a tissue product having an embossed area ranging from about 5 about 40 percent, and more preferably from about 8 to about 25 percent, and an embossed pattern consisting essentially of organic shaped embossed elements formed from dot emboss elements communicates to the consumer that the product is soft and cushiony. Additionally, at the foregoing embossed areas and shapes the emboss pattern has an aesthetic quality that does not appear overly complicated but simplistic and natural.

The multi-ply embossed tissue products of the present invention may have a basis weight from about 20 to about 80 gsm, such as from about 30 to about 65 gsm, such as from about 42 to about 60 gsm. In certain instances, the multi-ply embossed tissue products may comprise two, three or four tissue plies where the basis weight of each individual tissue plie is less than about 25 gsm, such as from about 10 to about 20 gsm, such as from about 10 to about 15 gsm.

In certain instances, the multi-ply embossed tissue products of the present invention may have a geometric mean tensile (GMT) strength from about 800 to about 1,800 g/3", such as from about 800 to about 1,600 g/3", such as from about 800 to about 1,500 g/3". In certain instances, the multi-ply embossed tissue products may comprise two, three or four tissue plies where the GMT of each individual tissue plie is less than about 600 g/3", such as from about 200 to about 425 g/3", such as from about 350 to about 550 g/3".

In other instances, the multi-ply embossed tissue products of the present invention may have a sheet bulk greater than about 7.00 cc/g, such as from about 7.00 to about 11.0 cc/g, such as from about 8.00 to about 10.0 cc/g. In certain instances, at the foregoing sheet bulks, the tissue products may have a sheet caliper greater than about 1,000 μm, such as from about 1,000 to about 2,000 μm, such as from about 1,000 to about 1,800 μm.

The foregoing multi-ply tissue products may be converted into rolled tissue products, such as rolled bath tissue products, comprising a multi-ply embossed tissue web spirally wound about a core. Such rolled tissue products may comprise a plurality of connected, but perforated, multi-ply tissue sheets that may be separated from adjacent sheets. Rolled tissue product may have a roll bulk greater than about 8.00 cc/g, such as from about 8.50 to about 15.0 cc/g, such as from about 9.00 to about 13.0 cc/g.

In certain instances, the present invention provides a multi-ply tissue product comprising a first embossed tissue ply having a basis weight from about 13 to about 20 gsm and a first and a second surface, the first surface having a plurality of dot embossments disposed thereon. The dot embossments are arranged to form an embossed element, a plurality of which may further be arranged to form an embossed pattern on the first surface of the first embossed tissue ply. The dot embossments forming the element may be separated and spaced apart from one another to define cushion regions there between.

The tissue product may comprise a cushion region supported by a pillow-like embossment disposed on an opposing tissue ply forming a portion of the multi-ply tissue product, as will be described in more detail below. The existence of the cushion regions, which are supported by opposing pillow-like embossments generates the visual appearance of soft cushions and improves the perceived softness of the product.

Moreover, the product has good mechanical properties, such as GMT, as well as good caliper and bulk. The properties of three- and four-ply tissue products prepared according to the present invention are summarized in Table 1, below.

TABLE 1

|  | Inventive Four-Ply Rolled Tissue Product | Inventive Three-Ply Rolled Tissue Product |
| --- | --- | --- |
| Basis Wt. (gsm) | 58 | 50 |
| Sheet caliper (mm) | 0.694 | 0.533 |
| Sheet bulk (cc/g) | 11.2 | 9.9 |
| Roll bulk (cc/g) | 10.2 | 10.1 |
| Kershaw Firmness (mm) | 9.30 | 10.51 |

Figure 3:
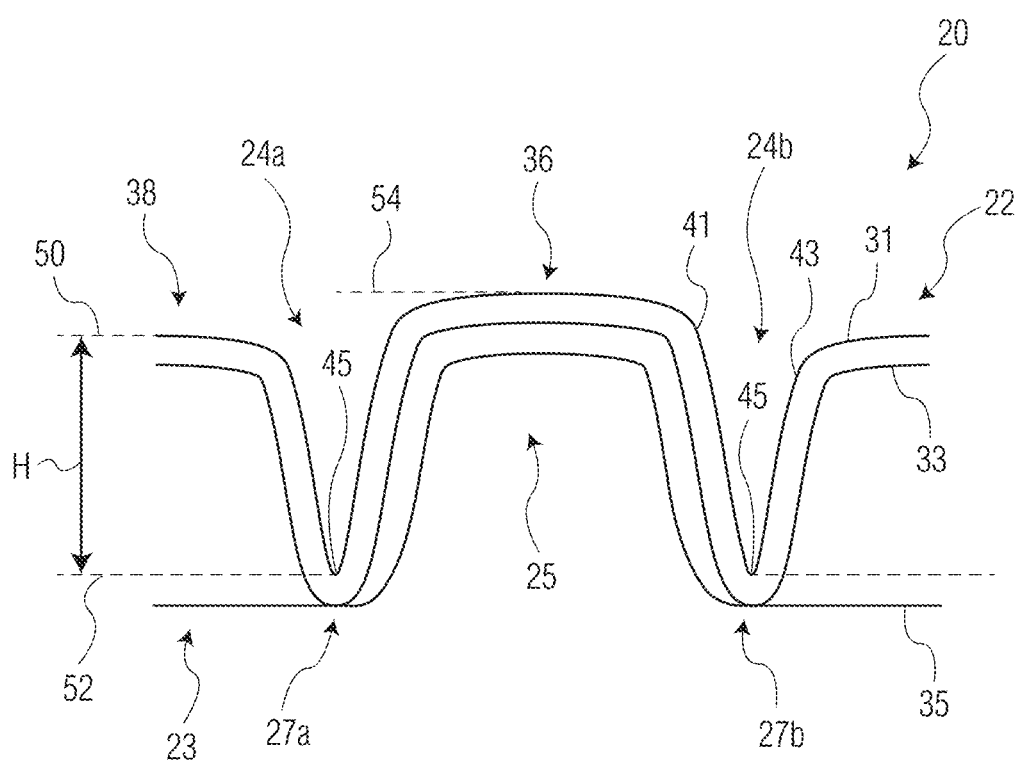
FIG. 3 is a schematic cross-sectional view of a three-ply tissue product according to one embodiment of the present invention.

With reference now to FIG. 3, a schematic cross-sectional view of a tissue product 20 according to one embodiment of the present invention is illustrated. The multi-ply tissue product 20 comprises a first, upper most, ply 31, a middle ply 33 and a bottom ply 35. The product 20 has an upper surface 22 formed from the first ply 31 and an opposed bottom surface 23 formed from the bottom ply 35. The top ply 31 is provided with embossments 24a, 24b which delimit a dome-like structure 36 disposed there between. In certain instances, the top ply can be provided with a micro-embossing pattern (not shown in FIG. 3), such as a pattern having a dot density of more than 30 dots per cm².

The embossments 24a, 24b may have an elongated shape having opposed side walls 41, 43 and a bottom portion 45, which may be substantially planar or curvilinear. The embossments 24 have an embossment height (H) that is generally the distance between the upper surface plane 50 of an unembossed region 38 and the surface plane 52 of the upper surface of the embossment bottom portion 45.

The embossments may be relatively wide near the tissue surface. For example, the embossments may have a cross-sectional dimension near the upper surface of the product from about 0.070 and about 0.40 mm². The cross-sectional geometry of the embossments at the surface of the tissue product may be selected from a variety of geometric shapes, such as, for example, circular or oval. In a particularly preferred embodiment, the embossments are similarly shaped and have a circular cross-sectional shape.

Between the spaced apart first embossments 24a, 24b are dome-like structures 36. The dome-like structure 36 has an upper surface lying in a second upper surface plane 54. In certain instances, the second upper surface plane 54 may lie above the first upper surface plane 50, providing the tissue product upper surface with at least two different planes. For example, the tissue product 20 may comprise unembossed regions 38 having an upper surface lying in a first surface plane 50 and dome-like structures 36 disposed between embossments 24a, 24b and lying in a second surface plane 54, wherein the second tissue product surface plane 54 is above the first tissue product surface plane 50.

As will be discussed in more detailed below, in certain instances, to elevate the dome-like structure 36 above the unembossed area 38, the structure 36 may be supported by a second embossment 25. The second embossment 25 may be disposed on a third (bottom) tissue ply 35 and registered with the first embossments 24a, 24b, such that the second embossment 25 nests into the dome-like structure 36 and is bounded by the first embossments 24a, 24b.

The product may further comprise a middle ply. The middle ply may comprise embossments arranged in an embossing pattern similar to the first ply embossing pattern. The first and second plies may be plied together such that the embossments are registered with one another. The embossments may be registered with one another by embossing the first and second plies in a single step. For example, the first and second plies may be plied together and then passed through a single embossing nip. In certain preferred embodiments the top and middle plies are not adhesively attached to one another, rather the plies are attached mechanically by embossing. In a particularly preferred embodiment, such as that illustrated in FIG. 3, the middle ply 33 is attached to the third (bottom) ply 35, such as by an adhesive, at discrete points 27a, 27b.

With continued reference to FIG. 3, the third ply 35 comprises a plurality of second embossments 25. The embossed first (top) 31 and second (middle) plies 33 are plied in registration with the third (bottom) ply 35 such that the second embossment 25 is disposed between the first embossments 24a, 24a. In this manner the second embossments 25 is arranged and sized so as to nest into the dome-like structure 36. In the embodiment illustrated in FIG. 3, only one second embossment 25 is nested with the dome-like structure. In other embodiments, however, the third ply may comprise more than one second embossment that has been sized and arranged to support the dome-like structure when the plies are arranged in a nested configuration.

In certain instances, such as illustrated in FIG. 3, the product 20 may comprise first and second surfaces 22, 23 having different embossing patterns and textures. More particularly, the first surface 22 may comprise a plurality of first embossments 24a, 24b that are spaced apart from one another and define dome-like structures 36 there between. The second surface 23 comprises second embossments 25, which are preferably differently shaped than the first embossments 24. For example, the first embossments 24 and second embossments 25 may differ in terms of shape, height, depth and/or area. In certain preferred embodiments the first embossments may be dot embossments having relatively small surface area and relatively deep and the second embossments may have a greater surface area and not as deep.

With reference now to FIGS. 4A-4C a tissue product 20 prepared according to the present invention is illustrated. FIG. 4A is a 3-D height profile of a first tissue product surface 22 comprising a plurality of first embossments 24a, 24b, which are spaced apart and define dome-like structures 36 there between having an upper surface lying in an upper surface plane. The first surface 22 also includes unembossed regions 38. Generally, the unembossed regions 38 have a surface lying in a surface plane below the surface plane of the dome-like structures. In the illustrated embodiment the upper surface of the dome-like structures lies about 200 μm above the surface of the unembossed regions and provides the tissue product with a cushiony appearance.

As illustrated in the cross-sectional profile of FIGS. 4B and 4C, the first embossments are generally deep. In certain instances, the first embossments may have a $H_{100}$ greater than about 500 μm, such as greater than about 600 μm and more preferably greater than about 700 μm and even more preferably greater than about 800 μm, such as from about 500 to about 1,200 μm, such as from about 700 to about 1,000 μm. Further, the first embossments may have relatively steep sidewalls and relatively narrow lower portions. In this manner, the first embossments may have a $H_{50}$ greater than about 350 μm, such as from about 350 to about 500 μm, such as from about 400 to about 500 μm, and a $W_{50}$ less than about 500 μm, such as from about 300 to about 500 μm, such as from about 300 to about 400 μm.

Figure 5A:
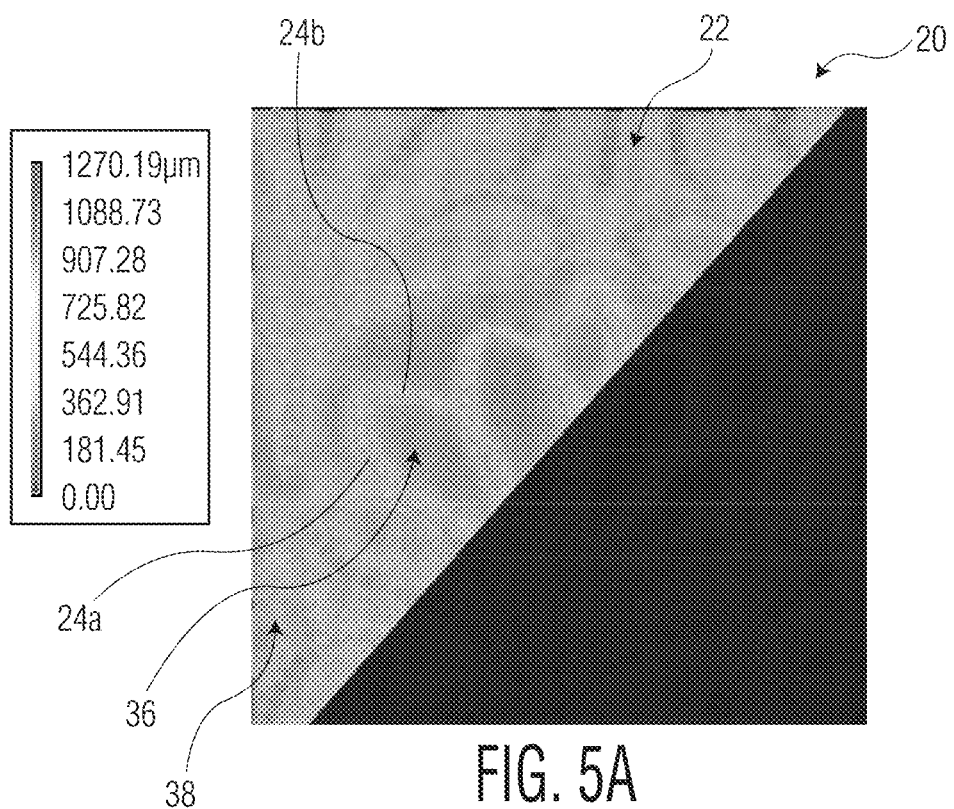
FIG. 5A is a 3-D surface profile of a tissue product according to another embodiment of the present invention, the image was taken using a VHX-1000 Digital Microscope manufactured by Keyence Corporation (Osaka, Japan) at a magnification of ×100.
Figure 5B:
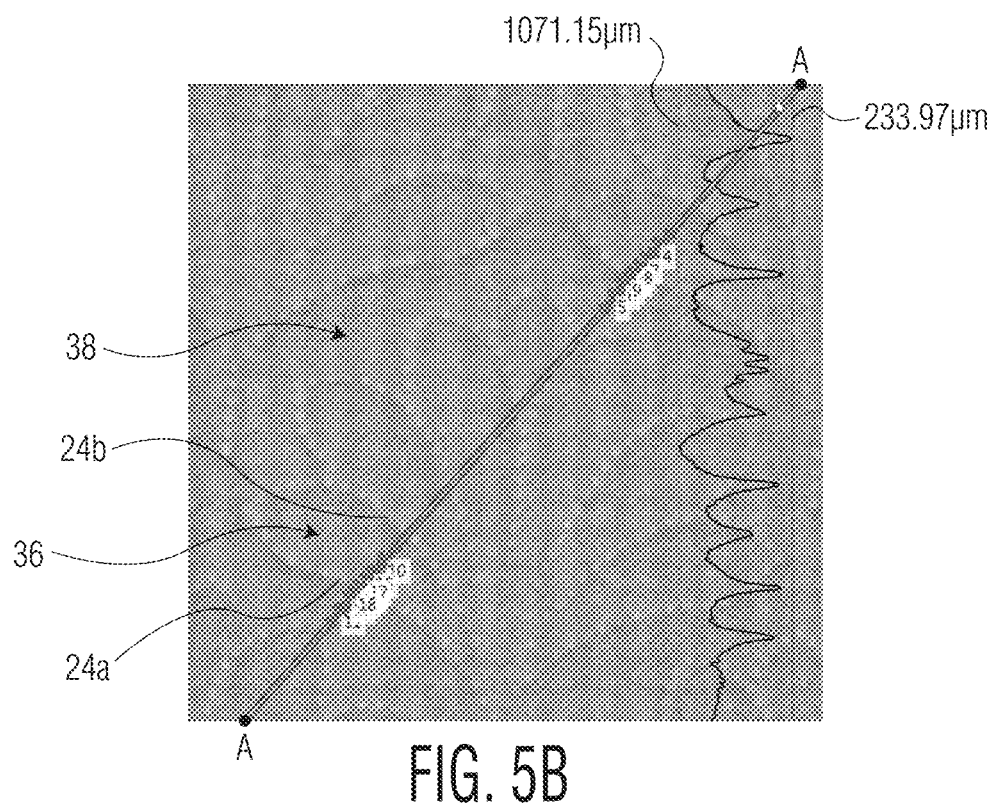
FIG. 5B is a 2-D image of the product of FIG. 5A and a plot of the surface topography through line A-A, the image was taken using a VHX-1000 Digital Microscope manufactured by Keyence Corporation (Osaka, Japan) at a magnification of ×100.

With reference now to FIGS. 5A-5C another tissue product 20 prepared according to the present invention is illustrated. FIG. 5A is a 3-D height profile of the first tissue product surface comprising a plurality of first embossments 24a, 24b, which are spaced apart and define dome-like structures 36 there between. The first surface 22 also includes unembossed regions 38. Generally, the unembossed regions 38 have a surface lying in a surface plane below the surface plane defined by the upper surface of the dome-like structures. In the illustrated embodiment, the upper surface of the dome-like structures lies about 200 μm above the surface of the unembossed regions and provides the tissue product with a cushiony appearance.

As illustrated in the cross-sectional profile of FIGS. 5B and 5C, the first embossments are generally deep. For example, the first embossments may have a $H_{100}$ from about 700 to about 1,000 μm. Further, the first embossments may have lower portions that are relatively narrow, such as $W_{25}$ less than about 600 μm, such as from about 400 to about 600 μm and upper portions that are relatively broad, such as $W_{100}$ greater than about 1,500 μm, such as from about 1,500 to about 2,500 μm. For example, in certain instances the first embossments may have a $H_{50}$ greater than about 350 μm, such as from about 350 to about 500 μm, such as from about 400 to about 500 μm, and a $W_{50}$ less than about 500 μm, such as from about 300 to about 500 μm, such as from about 300 to about 400 μm.

Figure 6A:
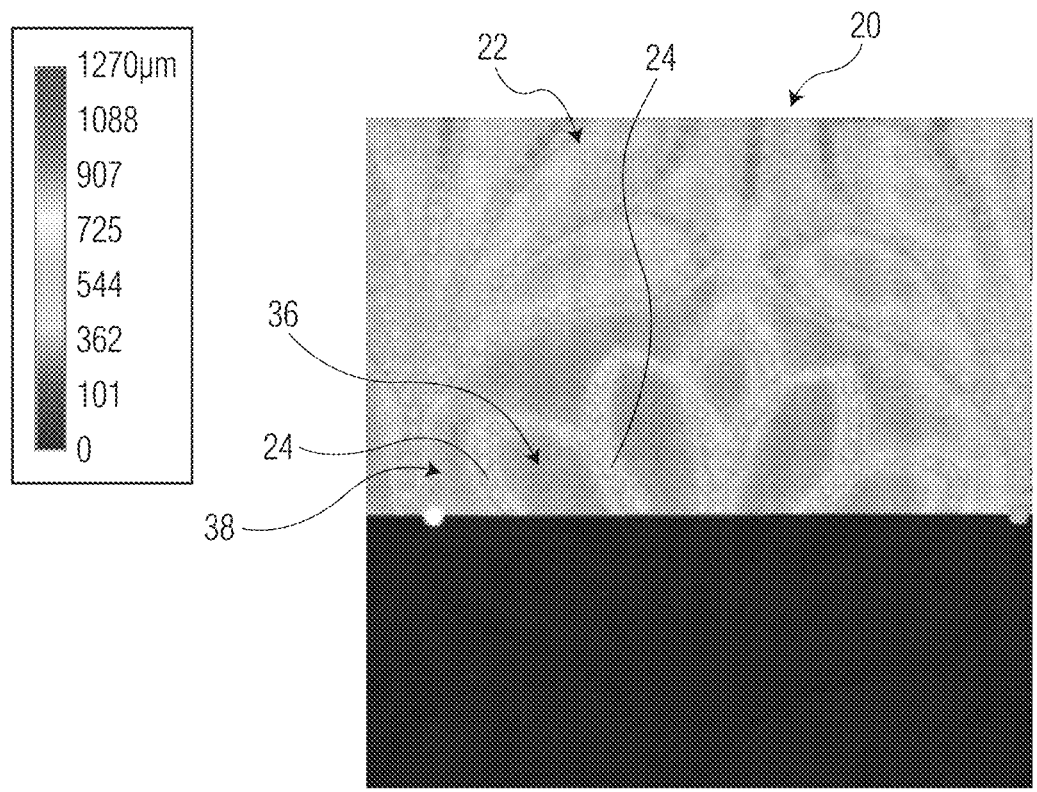
FIG. 6A is a 3-D surface profile of a tissue product according to another embodiment of the present invention, the image was taken using a VHX-1000 Digital Microscope manufactured by Keyence Corporation (Osaka, Japan) at a magnification of ×100.
Figure 6B:
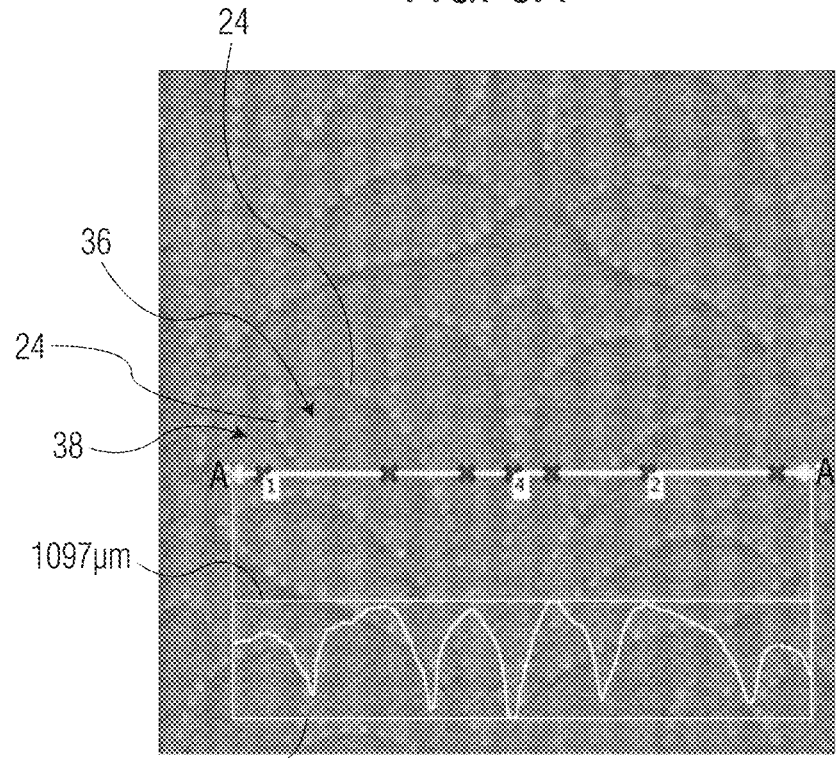
FIG. 6B is a 2-D image of the product of FIG. 6A and a plot of the surface topography through line A-A, the image was taken using a VHX-1000 Digital Microscope manufactured by Keyence Corporation (Osaka, Japan) at a magnification of ×100.
Figure 6C:
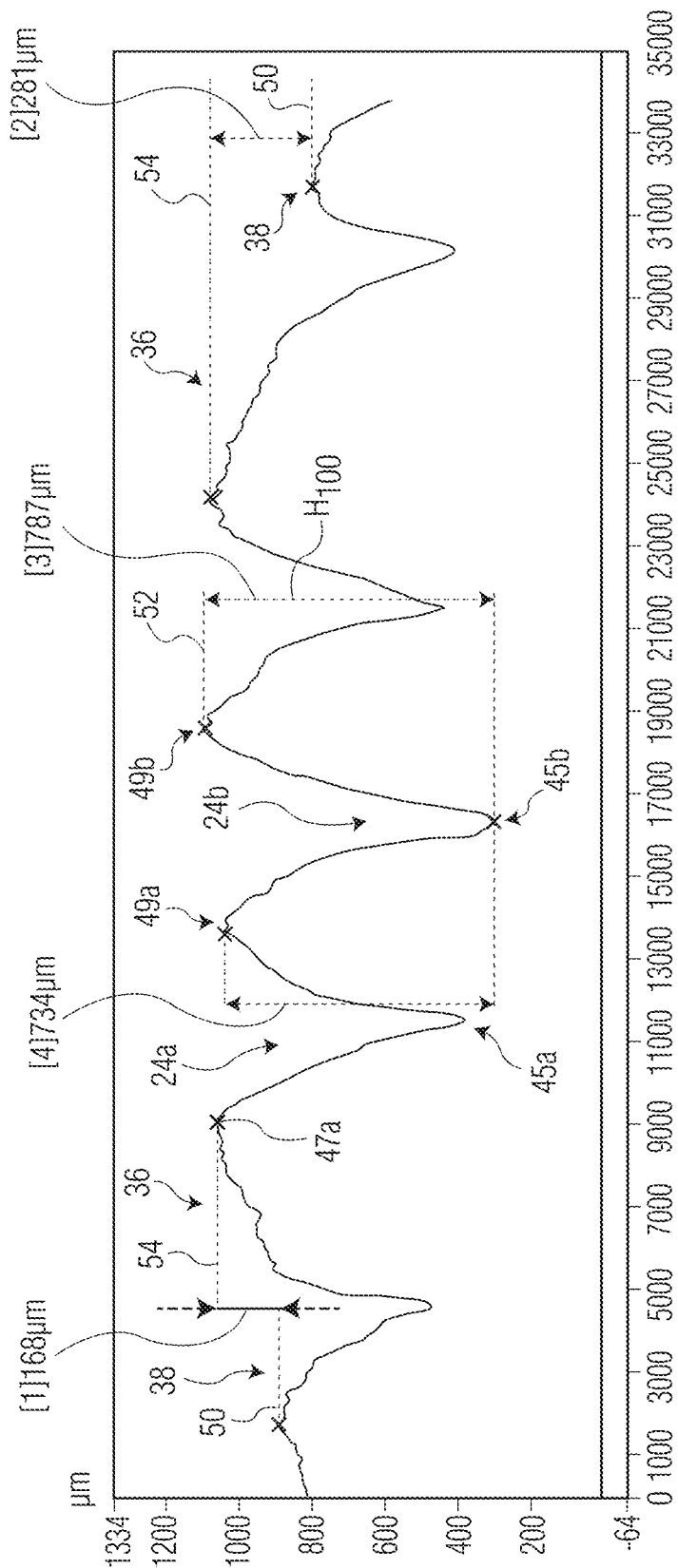
FIG. 6C is a cross-sectional height profile of the product of FIG. 6B through line A-A.

With reference to FIGS. 6A-6C another tissue product prepared according to the present invention is illustrated. FIG. 6A is a 3-D height profile of the first surface of the tissue product comprising a plurality of first embossments 24, which are spaced apart and define dome-like structures 36 there between. The first surface also includes unembossed regions 38. In the illustrated embodiment, the upper surface of the dome-like structures lies from about 120 to about 300 μm above the surface of the unembossed regions and provides the tissue product with a cushiony appearance. In certain preferred embodiments, the upper surface of the dome-like structures lies about 200 μm above the surface of the unembossed regions.

As illustrated in FIGS. 6B and 6C, the first embossments are generally deep, such as a $H_{100}$ greater than about 500 μm and more preferably greater than about 600 μm and still more preferably greater than about 700 μm, such as from about 700 to about 1,000 μm.

Generally, the embossed tissue products are an improvement over prior art embossed tissue products, particularly in terms of embossment pattern clarity and definition. Without being bound by any particular theory, it is believed that the improvement in pattern clarity and definition is attributable, in-part, to first embossments that are relatively deep with broad top portions and relatively narrow bottom portions. For example, the first embossments may have a $H_{100}$ (a measurement of embossment depth) from about 700 to about 1,000 μm and a $W_{25}$ (a measurement of size of the embossment at is bottom portion) less than about 600 μm, such as less than about 500 μm, such as from about 300 to about 600 μm. In other instances, the first embossments may have ratios of $W_{100}$ to $W_{25}$ (measurements of the relative size of an embossment at its top and bottom portions) greater than about 3.0, such as greater than about 3.25, such as greater than about 3.5, such as from about 3.0 to about 4.0.

The novel features of the present tissue products compared to those of the prior art are further summarized in Table 2, below.

dome-like regions. This requires an embossing process in which the top and bottom plies are embossed in a synchronized manner in order to ensure the desired nesting arrangement.

To produce multi-ply tissue products, multiple base tissue sheets are prepared and then combined using well known processing machines (converting machines) which include operations such as unwinding the base tissue sheets, calendering, printing, embossing, bonding of individual plies to be combined together as well as cutting, perforation and folding. It is particularly preferred that one or more base sheets are embossed during formation of the product. An embossing process is carried out in the nip between an embossing roll, also referred to herein as a patterned roll, and an anvil roll, also referred to herein as a counter roll. The embossing roll can have protrusions on its circumferential surface leading to embossments in the paper web.

In certain embodiments the tissue products of the present invention may be manufactured from two or more base sheet webs, such as two, three or four base sheet webs that are combined together and embossed using an embossing technique commonly referred to as DESL (Double Embossing Single Lamination), which in certain instances may be arranged so as to provide a nested configuration, as described in more detail below. In the DESL process, a first web is directed through the nip between an embossing roll and an anvil roll. In this nip the web is provided with an embossing pattern. Thereafter, an application roll for adhesive applies adhesive to those parts of the first web at which there are protruding embossing elements in the embossing roll. The adhesive is transported from an adhesive bath via an adhesive transfer roll to the application roll. A second web is transported to the first web and adhesively bonded to the first web in the nip between the so-called marrying roll and the embossing roll. The adhesive bonding takes place at those portions at which the adhesive was applied.

The process further comprises an additional pair of rolls consisting of a second embossing roll and a second anvil roll. The additional pair of rolls serves to emboss the second web before it is adhesively bonded to the first web using the marrying roll. Typically, the additional pair of rolls is placed close to the first pair of rolls and the marrying roll. Especially when using the so-called Nested-method, such close arrangement is important. The Nested-method can be considered as a special case of the general DESL-manufacturing method. For the Nested-method the embossing elements of

TABLE 2

| Product | Product Type | Mfg. | $H_{100}$ (μm) | $H_{50}$ (μm) | $H_{25}$ (μm) | $W_{100}$ (μm) | $W_{50}$ (μm) | $W_{25}$ (μm) | $W_{100}:W_{50}$ | $W_{100}:W_{25}$ | $W_{50}:W_{25}$ |
|---|---|---|---|---|---|---|---|---|---|---|---|
| Just One | Towel | Essity | 669 | 334 | 167 | 1314 | 1070 | 979 | 1.23 | 1.34 | 1.09 |
| Scott Calorie Light | Towel | K-C | 730 | 365 | 183 | 1848 | 1254 | 1067 | 1.47 | 1.73 | 1.17 |
| Sparkle | Towel | G-P | 792 | 396 | 198 | 1862 | 1371 | 1157 | 1.36 | 1.62 | 1.19 |
| Scott Clean Care | Bath Tissue | K-C | 466 | 233 | 116 | 1348 | 602 | 474 | 2.25 | 2.88 | 1.28 |
| Angel Soft | Bath Tissue | G-P | 765 | 383 | 191 | 1190 | 763 | 613 | 1.56 | 1.94 | 1.24 |
| Inventive 1 | Bath Tissue | — | 803 | 402 | 201 | 2193 | 928 | 591 | 2.36 | 3.71 | 1.57 |
| Inventive 2 | Bath Tissue | — | 710 | 355 | 177 | 1585 | 691 | 491 | 2.29 | 3.23 | 1.41 |

The tissue products of the present invention, in particular embodiments, may be manufactured by a process whereby the top and bottom plies are embossed such that when they are combined, the first embossments of the top ply form dome-like regions there between and the second embossments of the bottom ply are nested within, and support, the the first embossing roll and the embossing elements of the second embossing roll are arranged such that the embossed elements of the first embossed ply and the embossed elements of the second embossed ply fit into each other similar to a gearing system. This serves to achieve a mutual stabilization of the two plies. However, for the DESL manufacturing method such correlation between the embossed elements of the first, upper ply, and the second, lower ply, does not have to apply.

Figure 7:
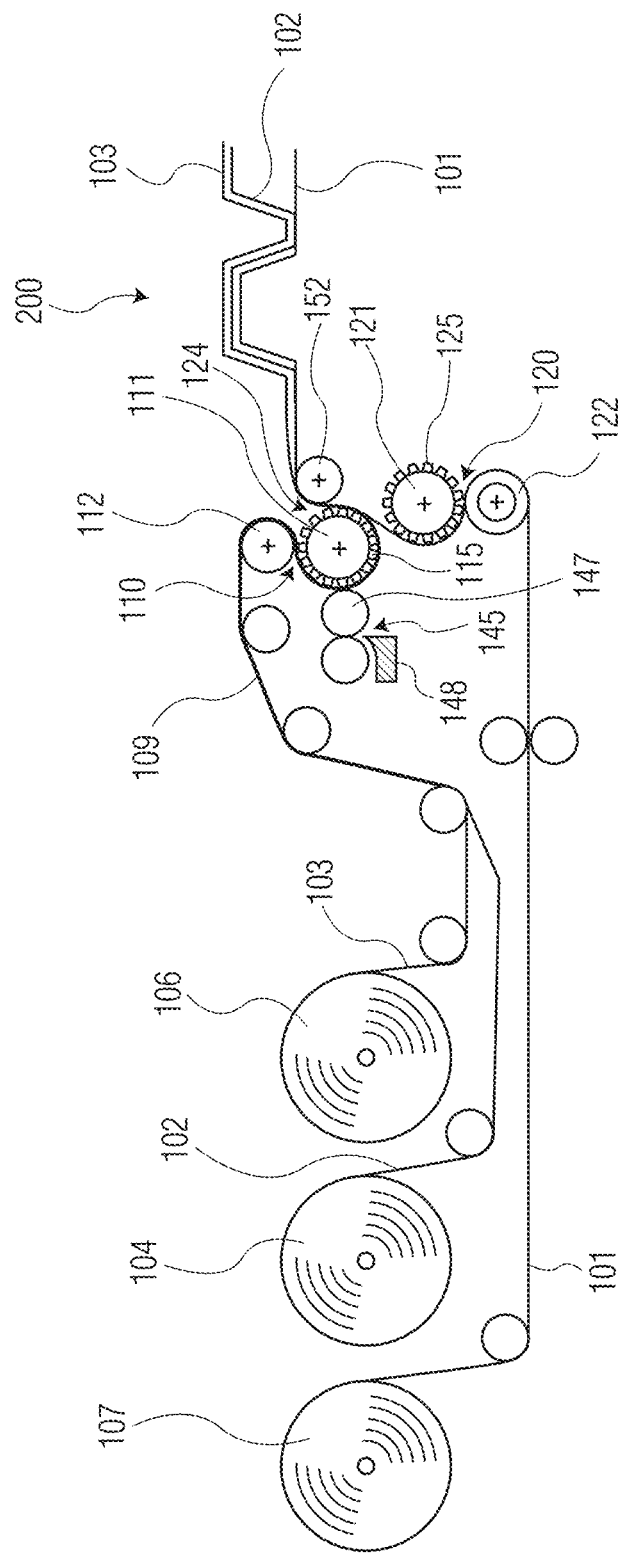
FIG. 7 is a schematic of a process useful in the manufacture of a three-ply tissue product according to the present invention.

Turning now to FIG. 7, to form a three-ply tissue product 200 comprising first, second and third plies 101, 102, 103, first and second plies 102, 103 are unwound from first and second parent rolls 104, 106 and plied together prior to embossing and the third ply 101 is unwound from a third parent roll 107. In certain instances, one or plies may be optionally pre-embossed in a first pre-embossing station or be subjected to other converting steps, such as calendering or slitting.

Figure 8:
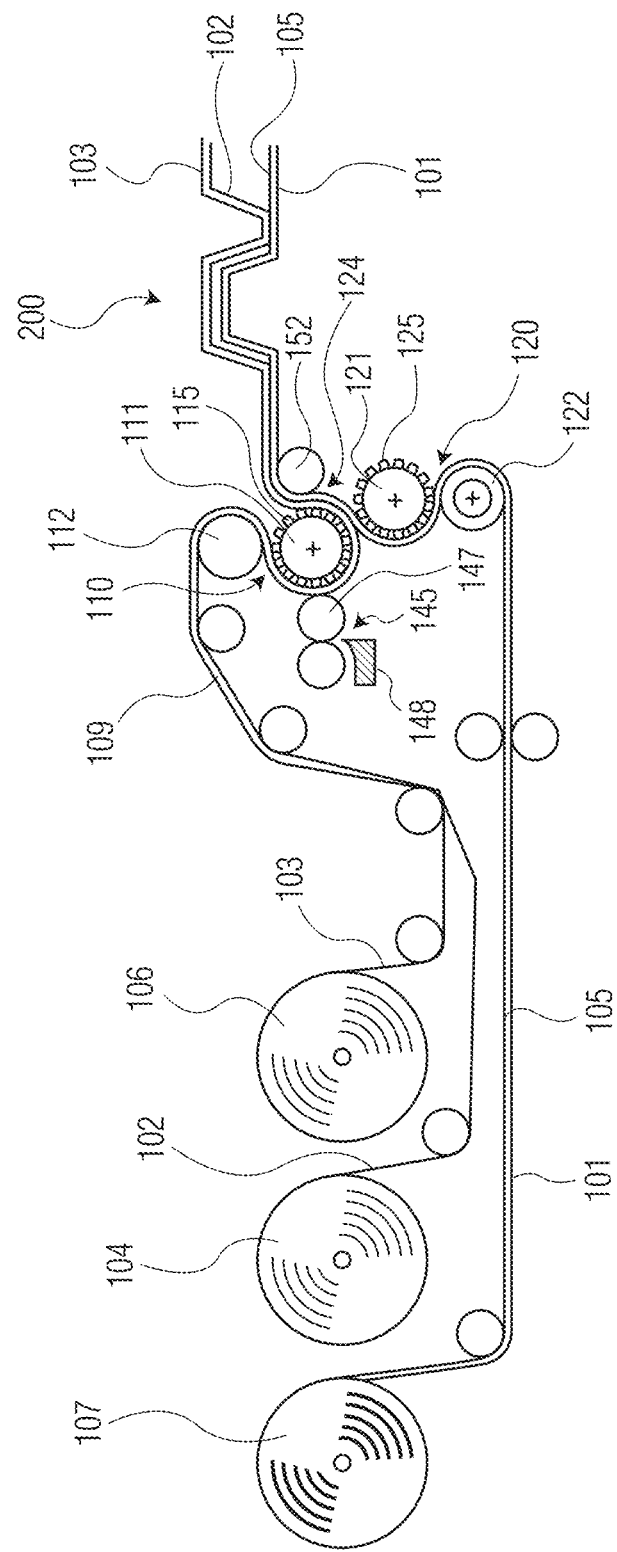
FIG. 8 is a schematic of a process useful in the manufacture of a four-ply tissue product according to the present invention.

FIG. 8 illustrates a similar process as that illustrated in FIG. 7, except that the bottom ply comprises two separate plies 101, 105, which are unwound from a single parent roll 107 prior to embossing. In this manner the tissue product 200 has four plies 101, 102, 103 and 105.

The embossing operation of the present invention utilizes an embossing roll and an anvil that create a nip pressure, when engaged with one another to form an embossing nip, sufficient to create deformations (embossments) in a fibrous structure present within the embossing nip. The embossing roll generally comprises a plurality of protrusions on its outer surface where the protrusions form an embossing pattern. For example, as illustrated in FIG. 7, the first and second plies 102, 103 are directed into the first nip 110 of a first embossing station that includes a first embossing roll 111 and an anvil roll 112. In the nip between the first embossing roll 111 and anvil roll 112, the first and second plies 102, 103 receive a first embossing pattern by being brought into contact with first protuberances 115 disposed on the surface of the first embossing roll 111.

In particular embodiments, the embossing roll is made of metal, especially steel, hard plastics materials or hard rubber. In case of plastics, very hard plastic material can be preferred, alternatively a resin material is also possible. In particular embodiments, the anvil roll is made of rubber like EPDM or NBR (acrylonitrile-butadiene rubber), paper or steel. The rubber can have a hardness between 20 and 85 Shore A, preferably between 35 and 60 Shore A and most preferably a hardness of about 45 Shore A.

The embossing roll may be made by any suitable process known in the art. Non-limiting examples of suitable processes include laser engraving hard plastic (ebonite) or ceramic or other material suitable for laser ablation to remove material and create embossing elements, chemical engraving of steel or other materials to remove material and create embossing elements, machining aluminum or steel or other metals to remove material and create embossing elements, metallizing processes to build up embossing elements, sintering processes to build up embossing elements and/or other means known in the art to remove material or build up material and achieve a surface topography with the desired pattern and clearances between mating embossing elements.

The bottom ply 101, also referred to herein as the third ply, is unwound from a third parent roll 107 and introduced into the nip 120 formed between a second embossing roll 121 and a second anvil roll 122 which form a second embossing station. As regards the possible materials for the second embossing roll 121 and a second anvil roll 122, the same materials as described above with reference to the first embossing roll 111 and the first anvil roll 112 also apply. Upon passing through the embossing nip 120 the bottom ply 101 is provided with a second embossing pattern, which is preferably different than the pattern applied by the first embossing station. The embossing pattern is imparted to the bottom ply 101 by contacting it with a plurality of second protuberances 125 disposed on the second embossing roll 121.

The process may further comprise an application device 145, which may include an applicator roll 147 for applying functional substances 148 to the second ply 102 after it exits the first embossing nip 110. Such applicator devices are well known in the art and commonly used for the application of adhesives or colored substances. For example, the process may comprise an applicator roll 147 which contacts the protrusions on the second ply 102 while supported by the first embossing roll 111.

In a particularly preferred embodiment, an adhesive is applied by the application device, which may comprise an adhesive applicator roll running against the first embossing roll. For laminating the single webs of material together, different types of adhesive can be used. Suitable adhesives are, inter alia, glue on the basis of starch or modified starch like, for example, methyl cellulose or carboxylated methyl cellulose, and adhesively acting polymers on the basis of synthetic resins, caoutchouc, polypropylene, polyisobutylene, polyurethane, polyacrylates, polyvinyl acetate or polyvinyl alcohol. Such adhesives can also contain coloring agents in order to improve the optical appearance of the finished products. Frequently, water-based glues are used for laminating together paper layers.

The first embossing roll 111 and the second embossing roll 121 are operated in registration with one another which means that both rolls have to be operated in a synchronized manner such that the embossed third ply 101 leaving the second embossing roll 121 can be directed in a predetermined positional relationship onto the first and second plies 102, 103 still on the surface of the first embossing roll 111. In this way, the first, second and third plies 101, 102, 103 are combined to form a subunit—the bottom ply embossments nest into the dome-like structures formed by the embossing pattern of the first and second plies.

Further, a marrying roll 152 runs against the first embossing roll 111 such that the subunit including the first and second plies 102, 103 and optionally a glue applied to a part of the surface of the second ply 102 can be brought in contact with the bottom ply 101. In this manner the bottom ply 101 is laminated to the middle ply 102 in a third nip 124 formed between the first embossing roll 111 and the marrying roll 152.

In use, the embossments formed on the bottom ply by the second embossing roll are registered with the dome-like structures disposed on an upper tissue ply. Registration in this manner is possible since the first embossing roll and the second embossing roll are preferably run in registration with one another. To facilitate this arrangement, the second embossing roll may be provided with a plurality of discrete, oval-shaped protrusions that generate the second embossments on the at least one bottom ply. The second embossments nest into the dome-like structures of the upper ply and may be arranged to stabilize the dome-like structures.

Figure 9:
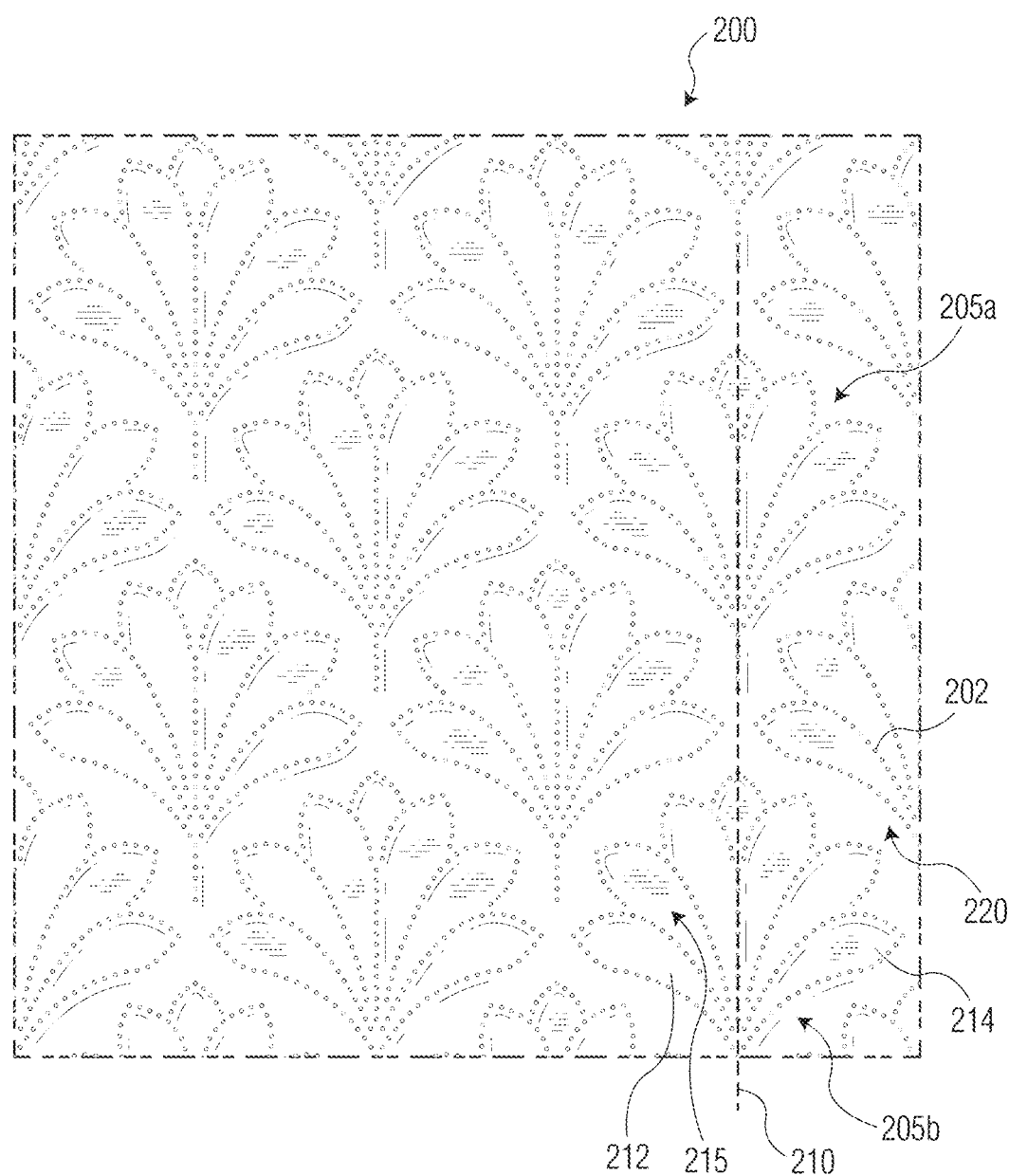
FIG. 9 is a top plan view of a portion of a patterned roll useful in the invention.

With reference now to FIG. 9, one example of an embossing pattern 200 useful in the present invention is illustrated. The pattern 200 is particularly useful for embossing an upper ply of a tissue product according to the present invention. The embossing pattern 200 comprises a plurality of discrete circular protrusions 202, also referred to as embossing elements, which in the illustrated embodiment are similarly sized and shaped. The discrete circular protrusions 202 are arranged to form embossing elements 205a, 205b, which may be further arranged to form the embossing pattern 200. In certain preferred embodiments, the embossing pattern 200 comprises a plurality of elements 205 that are substantially aligned with one another along an axis 210, which may be orientated in the machine direction (MD). The axis 210 may further divide individual elements into symmetrical first and second halves 212, 214.

When used to manufacture a tissue product, the embossing elements, which in the illustrated embodiment are a plurality of discrete circular protrusions 202 arranged to form elements 205, form a discontinuous line embossment in the tissue ply where the embossments are relatively deep with relatively broad upper portions and narrow lower portions. The elements 205 may further be designed such that they have an unembossed area that may form dome-like structures in the resulting tissue product. The portion of the embossing pattern 200 corresponding to the dome-like structures, generally identified as 215 in FIG. 9, are free from protrusions.

Between adjacent elements 205, the pattern 200 may include regions 220 that are substantially free from embossing elements. Such regions may correspond to unembossed regions of the resulting embossed first ply exemplified by reference numeral 38 in FIG. 1.

Figure 10:
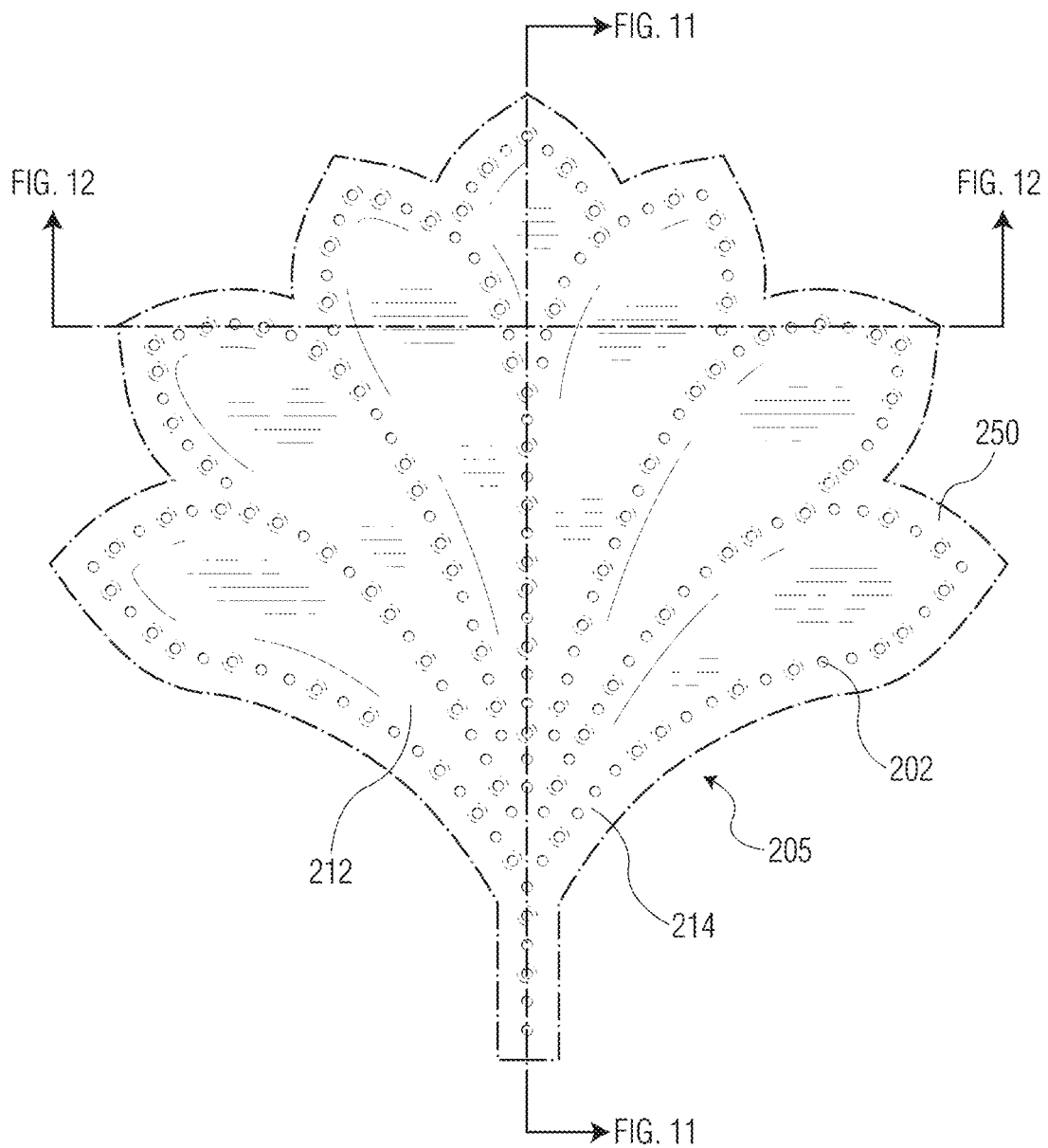
FIG. 10 is a detailed view of an element disposed on the patterned roll of FIG. 9.
Figure 11:
FIG. 11 is a cross-sectional view of the element of FIG. 10 through line FIG. 11-FIG. 11.
Figure 12:
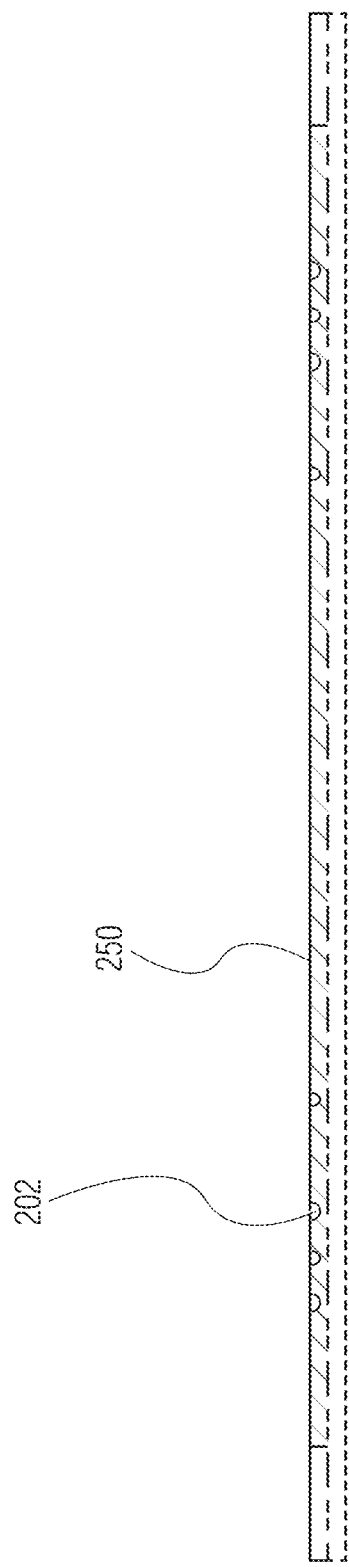
FIG. 12 is a cross-sectional view of the element of FIG. 10 through line FIG. 12-FIG. 12.

An embossing element 205 useful in embossing a tissue ply, particularly a top ply in a multi-ply product, is illustrated in further detail in FIGS. 10-12. The element 205 is formed from a plurality of embossing elements 202. The embossing elements 202 generally extend above the roll surface 250 a given height and are arranged to form a discontinuous line to create a flower-shaped element 205. The flower-shaped element 205 is symmetrical, having an axis that divides the element into symmetrical first and second halves 212, 214.

Figure 13:
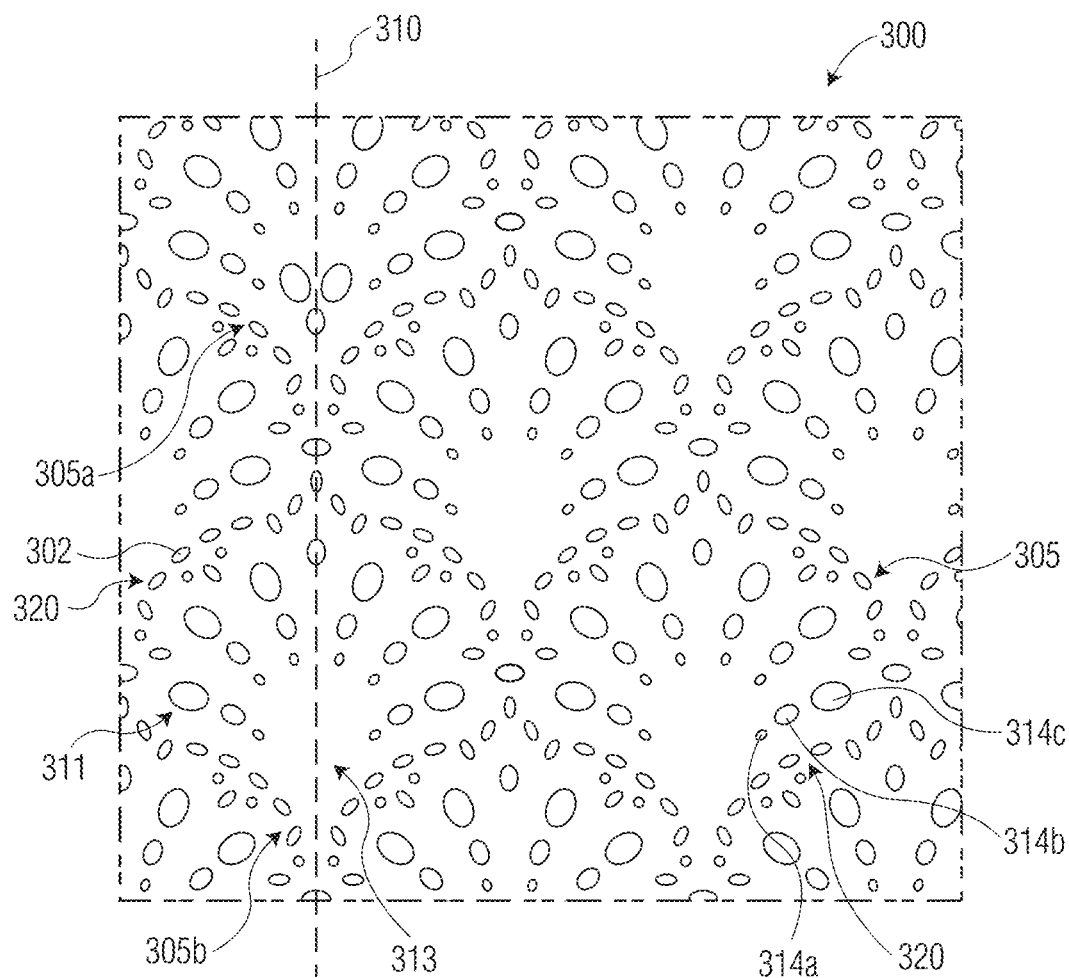
FIG. 13 is a top plan view of a portion of a patterned roll useful in the invention.
Figure 14:
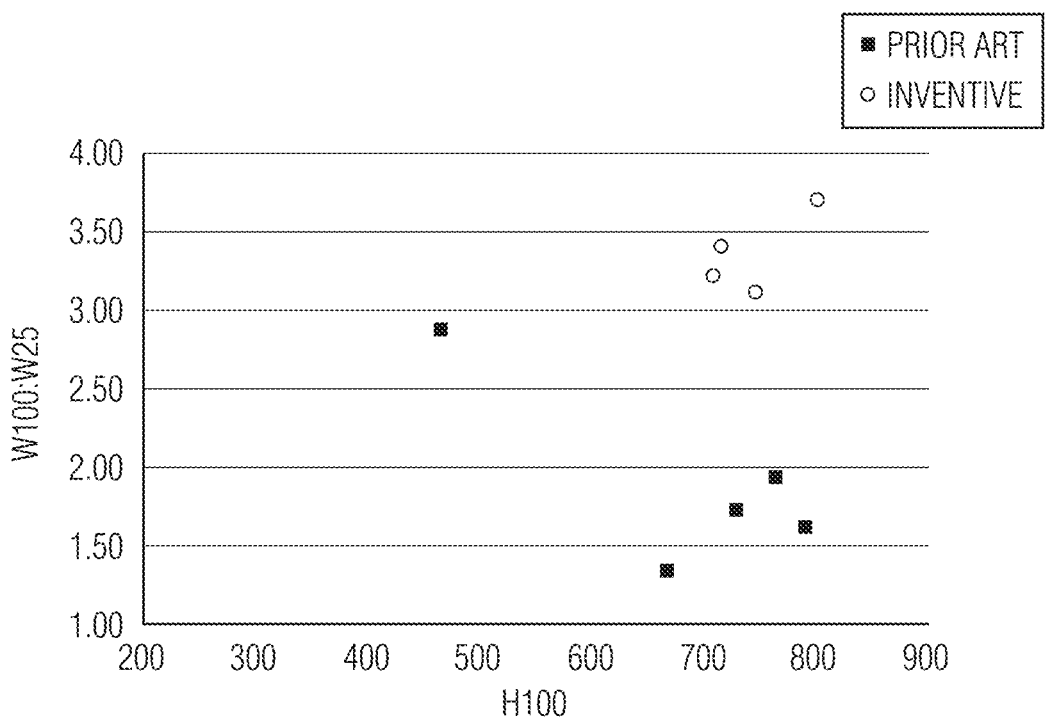
FIG. 14 is a plot of the ratio of $W_{100}$ to $W_{25}$ (Y-axis) versus $H_{100}$ (X-axis) for several prior art and inventive tissue products.
Figure 15:
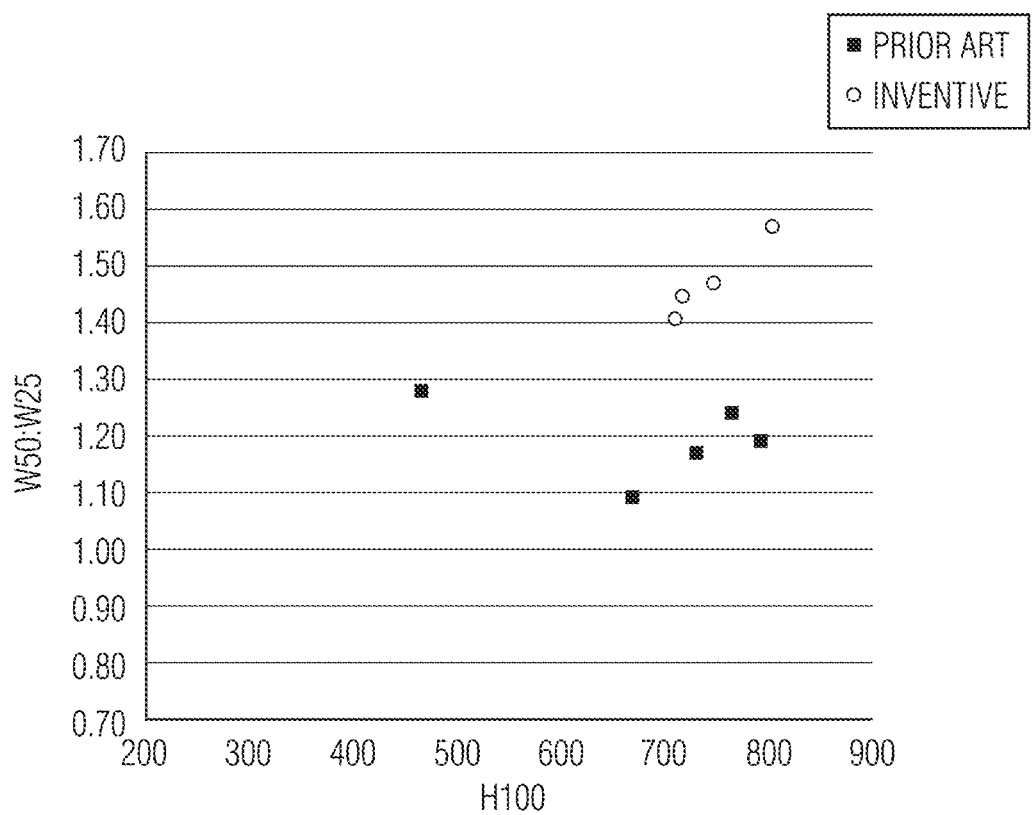
FIG. 15 is a plot of the ratio of $W_{50}$ to $W_{25}$ (Y-axis) versus $H_{100}$ (X-axis) for several prior art and inventive tissue products.
Figure 16:
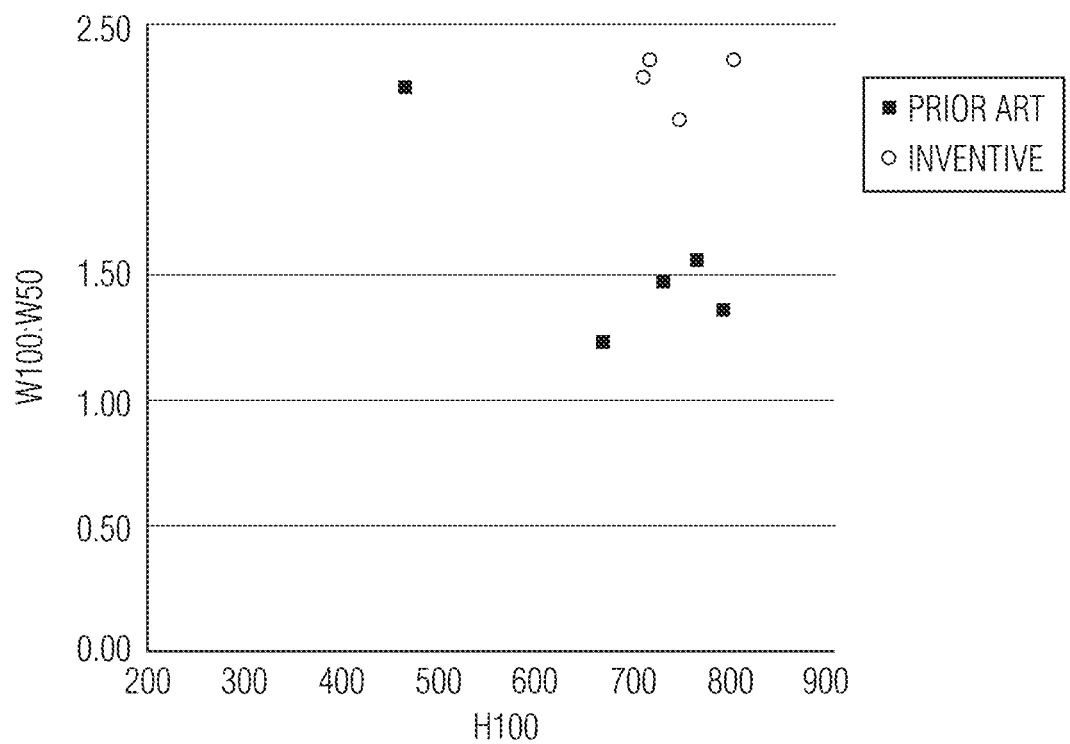
FIG. 16 is a plot of the ratio of $W_{100}$ to $W_{50}$ (Y-axis) versus $H_{100}$ (X-axis) for several prior art and inventive tissue products.
Figure 17:
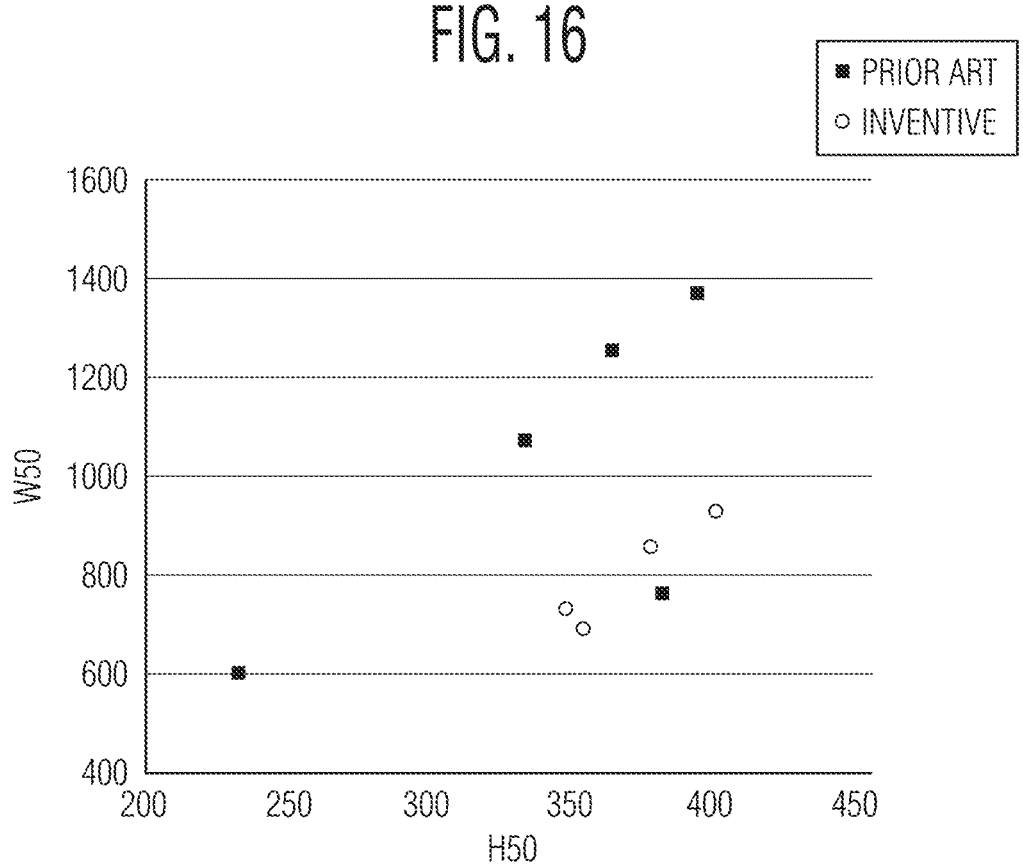
FIG. 17 is a plot of $W_{50}$ (Y-axis) versus $H_{50}$ (X-axis) for several prior art and inventive tissue products.

FIG. 13 shows a second embossing pattern 300 that may be applied to a second embossing roll and used to emboss the bottom ply of a tissue product according to the present invention. The pattern 300 comprises a plurality of discrete protrusions 302. The discrete protrusions 302 are arranged to form a discontinuous line and define embossing elements 305a, 305b, having an outer perimeter 320. The elements 305 may be aligned with one another along an axis 310 to form the pattern 300. Further, the axis 310 may divide individual elements 305 into symmetrical first and second halves 311, 313.

In addition to the discrete protrusions 302 forming the element perimeter 320, the embossing element 305 may further comprise a plurality of discrete protrusions, such as protrusions 314a-314c, generally disposed within the perimeter 320. The protrusions may be arranged such that they stabilize the dome-like structures of an upper tissue ply when producing a multi-ply tissue product according to the present invention.

Test Methods
Microscopy

Tissue products produced according to the present invention may be analyzed by microscopy as described herein. Particularly, the three-dimensional surface topography and embossments may be analyzed by generating and analyzing product 3-D surface maps and cross-sections, such as those illustrated in FIGS. 4A-6C. The images are taken using a VHX-1000 Digital Microscope manufactured by Keyence Corporation of Osaka, Japan. The microscope is equipped with VHX-5000 Communication Software Ver 1.5.1.1. The lens is an ultra-small, high performance zoom lens, VH-Z20R/Z20T.

The tissue product sample to be analyzed should be an undamaged, flat, and include representative embossments. A normal sheet of bath tissue, approximately 4 inches×4 inches in size, works well.

A three-dimensional image of the sample is obtained as follows:

1. Turn the digital microscope on and follow standard procedures for XY stage Initialization [Auto].
2. Turn the microscope magnification to ×100.
3. Place the tissue product sample on the stage with the first embossments facing up toward the lens.
4. If the fabric does not lie flat, place weights as needed along the perimeter to make fabric lie flat against the stage surface.
5. Use the focus adjustment to bring the fabric into sharp focus.
6. Select "Stitching" in the main menu. Select "3D stitching."
7. Set the stitching method by selecting "Stitch around the current position."
8. Select the Z set to set the upper and lower composition range. The upper limit should be set by going higher than the highest focal point that is clear. The lower limit should be set by going lower than the lowest focal point that is clear. After setting the upper and lower range, click OK.
9. Select "Start stitching" to begin accusation of the image.
10. In the 3D menu, select "Height/Color view" to identify dome-like features with the highest degree of topography.
11. In the 3D menu, select "Profile."
12. With the "Profile line" tab selected obtain a cross-section of the tissue sample identified in Step 10, select "Line" and using the cursor to draw a line across the identified portion of the sample. The line should bisect at least three adjacent first embossments, such as line A-A of FIG. 6B. The peaks on the right and left side of the first embossments should be relatively planar (difference in height less than 10%) such as points 47a and 49a of FIG. 6C. If the height difference between the peaks is more than 10% select another first embossment to measure.

To measure various embossment parameters, such as minimum and maximum heights and the distanced there between:

13. Select "Assist Tools."
14. Select "Max" tool to identify the maximum point to the right of the first embossment, such as point 49a to the right of the first embossment 24a of FIG. 6C.
15. Select "Max" tool to identify the maximum point to the left of the first embossment, such as point 47a to the left of the first embossment 24a of FIG. 6C.
16. Select "Min" tool to identify the minimum point in the first embossment, such as point 45a of the first embossment 24a of FIG. 6C.
17. Select "MidPoint" tool to determine the midpoint between the maximum peak on the right side of the first embossment and the first embossment minimum, such as the point M2 between the embossment minimum 45 and right side maximum 49 of the first embossment 24 of FIG. 5C.
18. Select "MidPoint" tool to determine the midpoint between the maximum peak on the left side of the first embossment and the first embossment minimum, such as the point M1 between the embossment minimum 45 and left side maximum 47 of the first embossment 24 of FIG. 5C.
19. Select "MidPoint" tool to determine the midpoint between the midpoint determined in step 17 and the minimum of the first embossment. This point is 25 percent of the distance between the maximum peak on the right side of the first embossment and the first embossment minimum, such as the point Q2 between the embossment minimum 45 and right side maximum 49 of the second embossment 24 of FIG. 5C.

20. Select "MidPoint" tool to determine the midpoint between the midpoint determined in step 18 and the minimum of the first embossment. This point is 25 percent of the distance between the maximum peak on the left side of the first embossment and the first embossment minimum, such as the point Q1 between the embossment minimum 45 and left side maximum 47 of the second embossment 24 of FIG. 5C.

To calculate the cross-sectional area of various portions of the embossments, such as $A_{100}$, $A_{50}$ and $A_{25}$:

21. Select "Assist Tools."
22. Select "CrsSct(bottom)." Check "Measure at arbitrary point" box.
23. Select the maximum point to the right of the first embossment (step 14), select the maximum point to the left of the first embossment (step 15). Set the right line to the right of the right side wall of the embossment. Set the left line to the left of the left side wall of the embossment. This value is $A_{100}$.
24. Select the midpoint to the right of the first embossment (step 17), select midpoint to the left of the first embossment (step 18). Set the right line to the right of the right side wall of the embossment. Set the left line to the left of the left side wall of the embossment. This value is $A_{50}$.
25. Select the midpoint of the midpoint to the right of the first embossment (step 19), select midpoint of the midpoint to the left of the first embossment (step 20). Set the right line to the right of the right side wall of the embossment. Set the left line to the left of the left side wall of the embossment. This value is $A_{25}$.

To measure the height of the embossments:

26. In the Measurement Tools, ensure the "Measure" tab is selected.
27. Select the "Pt-Pt" tool, then select Vertical from the pull-down menu.
28. Select the maximum point to the right of the first embossment (step 14), then select the minimum point (Step 16), then click on the place on the screen to display the measurement. This value will be used to calculate $H_{100}$ as described below and is the height (H2) between points 45 and 49 of FIG. 4C.
29. Select the maximum point to the left of the first embossment (step 15), then select the minimum point (Step 16), then click on the place on the screen to display the measurement. This value will be used to calculate $H_{100}$ as described below and is the height (H1) between points 45 and 47 of FIG. 4C.
30. Select the midpoint to the right of the embossment (step 17), then select the minimum point (step 16), then click on the place on the screen to display the measurement. This value will be used to calculate $H_{50}$ as described below and is the height (H4) between points 45 and M2 of FIG. 5C.
31. Select the midpoint to the left of the embossment (step 18), then select the minimum point (step 16), then click on the place on the screen to display the measurement. This value will be used to calculate $H_{50}$ as described below and is the height (H3) between points 45 and M1 of FIG. 5C.
32. Select the midpoint of the midpoint to the right of the embossment (step 19), then select the minimum (step 16), then click on the place on the screen to display the measurement. This value will be used to calculate $H_{25}$ as described below and is the height (H6) between points 45 and Q2 of FIG. 5C.
33. Select the midpoint of the midpoint to the left of the embossment (step 20), then select the minimum (step 16), then click on the place on the screen to display the measurement. This value will be used to calculate $H_{25}$ as described below and is the height (H5) between points 45 and Q1 of FIG. 5C.

Various parameters of the tissue product may be calculated from the foregoing measurements as indicated below:

34. To calculate $H_{100}$ average the values measured in steps 28 and 29.
35. To calculate $H_{50}$ average the values measured in steps 30 and 31.
36. To calculate $H_{25}$ average the values measured in steps 32 and 33.
37. To calculate $W_{100}$ divide $A_{100}$ (step 23) by $H_{100}$ (as determined in step 34).
38. To calculate $W_{50}$ divide $A_{50}$ (step 24) by $H_{50}$ (as determined in step 35).
39. To calculate $W_{25}$ divide $A_{25}$ (step 25) by $H_{25}$ (as determined in step 36).

Sheet Bulk

Sheet Bulk is calculated as the quotient of the dry sheet caliper (μm) divided by the basis weight (gsm). Dry sheet caliper is the measurement of the thickness of a single tissue sheet measured in accordance with TAPPI test methods T402 and T411 om-89. The micrometer used for carrying out T411 om-89 is an Emveco 200-A Tissue Caliper Tester (Emveco, Inc., Newberg, OR). The micrometer has a load of 2 kilo-Pascals, a pressure foot area of 2,500 square millimeters, a pressure foot diameter of 56.42 millimeters, a dwell time of 3 seconds, and a lowering rate of 0.8 millimeters per second.

Tensile

Tensile testing was done in accordance with TAPPI test method T-576 "Tensile properties of towel and tissue products (using constant rate of elongation)" wherein the testing is conducted on a tensile testing machine maintaining a constant rate of elongation and the width of each specimen tested is 3 inches. More specifically, samples for dry tensile strength testing were prepared by cutting a 3±0.05 inch (76.2±1.3 mm) wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was an MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on direction of the sample being tested. Ten representative specimens were tested for each product or sheet and the arithmetic average of all individual specimen tests was recorded as the appropriate MD or CD tensile strength of the product or sheet in units of grams of force per 3 inches of sample. The geometric mean tensile (GMT) strength was calculated and is expressed as grams-force per 3 inches of sample width. Tensile energy absorbed (TEA) and slope are also calculated by the tensile tester. TEA is reported in units of gmcm/cm². Slope is recorded in units of kg. Both TEA and Slope are directionally dependent and thus MD and CD directions are measured independently. Geometric mean TEA and geometric mean slope are defined as the square root of the product of the representative MD and CD values for the given property.

Multi-ply products were tested as multi-ply products and results represent the tensile strength of the total product. For example, a two-ply product was tested as a two-ply product and recorded as such. A basesheet intended to be used for a two-ply product was tested as two plies and the tensile recorded as such. Alternatively, a single ply may be tested, and the result multiplied by the number of plies in the final product to get the tensile strength.

EMBODIMENTS

In a first embodiment the present invention provides a multi-ply tissue product comprising a first ply having a first surface and a plurality of discrete, spaced apart, dot embossments disposed thereon and a plurality of dome-like structures disposed between the spaced apart dot embossments and a second ply having a first surface and a plurality of discrete embossments disposed thereon, wherein the dot embossments have a height ($H_{100}$) greater than 500 µm and an average width at 25% height ($W_{25}$) less than about 600 µm.

In a second embodiment the present invention provides the product of the first embodiment wherein the tissue product has a geometric mean tensile (GMT) strength from about 800 to about 1,700 g/3".

In a third embodiment the present invention provides the product of the first or the second embodiments wherein the tissue product consists of three plies and has a basis weight from about 30 to about 50 grams per square meter (gsm).

In a fourth embodiment the present invention provides the product of any one of the foregoing embodiments wherein the first and second plies have a basis weight from about 10 to about 20 gsm.

In a fifth embodiment the present invention provides the product of any one of the foregoing embodiments wherein the tissue product has a sheet bulk from about 7.0 to about 11.0 cubic centimeters per gram (cc/g).

In a sixth embodiment the present invention provides the product of any one of the foregoing embodiments wherein the tissue product is spirally wound around a core to yield a rolled tissue product having a roll bulk from about 8.0 to about 13.0 cc/g.

In a seventh embodiment the present invention provides the product of any one of the foregoing embodiments wherein the dot embossments have a $H_{100}$ from 700 to about 1,000 µm.

In an eighth embodiment the present invention provides the product of any one of the foregoing embodiments wherein the dot embossments have a ratio of average width at 100% height ($W_{100}$) to $W_{25}$ from about 3.00 to about 4.00.

In a ninth embodiment the present invention provides the product of any one of the foregoing embodiments wherein the dot embossments have a ratio of average width at 50% height ($W_{50}$) to $W_{25}$ greater than about 1.40.

In a tenth embodiment the present invention provides the product of any one of the foregoing embodiments wherein the tissue product has a basis weight of about 60 gsm or less and a GMT less than about 1,500 g/3" and the dot embossments have a $W_{50}$ less than about 1,000 µm and an average height at 50% ($H_{50}$) greater than about 350 µm.

What is claimed is:

1. A multi-ply tissue product comprising first and second tissue plies, the first ply having embossed and unembossed regions, the embossed regions comprising a plurality of first embossments arranged in an embossing pattern and defining a dome-like structure there between, the unembossed region having an upper surface lying in a first tissue product surface plane and the dome-like structure having an upper surface lying in a second tissue product surface plane, wherein the second tissue product surface plane is at least 100 µm above the first tissue product surface plane and wherein the tissue product has a geometric mean tensile (GMT) strength from about 800 to about 1,500 g/3" and a basis weight from about 30 to about 80 grams per square meter (gsm) and wherein the first embossments have a ratio of average width at 100% height ($W_{100}$) to Average Width at 25% Height ($W_{25}$) from about 3.00 to about 4.00.

2. The multi-ply tissue product of claim 1 further comprising a plurality of second embossments disposed on the second ply, wherein at least one of the plurality of second embossments disposed on the second ply nests into the dome-like structure and is bounded by at least two spaced apart first embossments.

3. The multi-ply tissue product of claim 2 further comprising a third ply disposed between the first and second plies, wherein the third ply comprises embossments registered with the first embossments and the third ply is bonded to the first ply.

4. The multi-ply tissue product of claim 2 wherein the first embossments are discrete dot embossments, and the second embossments are discrete embossments.

5. The multi-ply tissue product of claim 1 wherein the tissue product has sheet bulk from about 7.0 to about 11 cubic centimeters per gram (cc/g).

6. The multi-ply tissue product of claim 1 wherein the tissue product is spirally wound around a core to yield a rolled tissue product having a roll bulk from about 8.0 to about 13 cc/g.

7. The multi-ply tissue product of claim 1 wherein the first embossments have a Average Height at 100% ($H_{100}$) from 700 to about 1,000 µm.

8. The multi-ply tissue product of claim 1 wherein the first embossments have a ratio of average width at 50% height ($W_{50}$) to $W_{25}$ is greater than about 1.40.

9. The multi-ply tissue product of claim 1 wherein the product has a basis weight from about 42 gsm to about 60 gsm and the first embossments have a Average Width at 50% Height ($W_{50}$) less than about 1,000 µm and an average height at 50% ($_{50}$) greater than about 350 µm.

* * * * *